US012328564B2

(12) United States Patent
Chen et al.

(10) Patent No.: US 12,328,564 B2
(45) Date of Patent: Jun. 10, 2025

(54) METHOD AND APPARATUS FOR PERFORMING AUDIO ENHANCEMENT WITH AID OF TIMING CONTROL

(71) Applicant: MEDIATEK INC., Hsin-Chu (TW)

(72) Inventors: Hsi-Hsien Chen, Hsinchu (TW); Yili Wang, Chengdu (CN); Chia-Wei Tao, Hsinchu (TW); Sheng-Ming Wang, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 380 days.

(21) Appl. No.: 18/076,334

(22) Filed: Dec. 6, 2022

(65) Prior Publication Data

US 2024/0107250 A1 Mar. 28, 2024

(30) Foreign Application Priority Data

Sep. 22, 2022 (CN) ......................... 202211161413.9

(51) Int. Cl.
*G06F 3/16* (2006.01)
*H04R 1/10* (2006.01)
*H04S 3/00* (2006.01)
*H04S 7/00* (2006.01)

(52) U.S. Cl.
CPC ........... *H04S 3/008* (2013.01); *H04R 1/1041* (2013.01); *H04S 7/301* (2013.01); *H04R 2420/07* (2013.01)

(58) Field of Classification Search
CPC ....... H04S 3/008; H04S 7/301; H04R 1/1041; H04R 2420/07
See application file for complete search history.

(56) References Cited

U.S. PATENT DOCUMENTS 9,877,130 B2 1/2018 Jia
11,102,565 B1 * 8/2021 Girardier ................ H04W 4/80
12,198,732 B2 * 1/2025 Cheong ................... H04W 4/80
2008/0226103 A1 * 9/2008 Schobben ................ H04R 5/04
381/309

FOREIGN PATENT DOCUMENTS

CN 111918261 A 11/2020
CN 112492449 A 3/2021
CN 112787742 A 5/2021
(Continued)

*Primary Examiner* — Joseph Saunders, Jr.
(74) *Attorney, Agent, or Firm* — Winston Hsu

(57) ABSTRACT

A method for performing audio enhancement with aid of timing control includes: utilizing a UE to determine a first predetermined synchronization delay and notify a first earphone of the first predetermined synchronization delay, wherein a first DSP circuit in the first earphone is arranged to determine a synchronization point according to a first time point of a first event and the first predetermined synchronization delay for the first earphone; utilizing the UE to determine a second predetermined synchronization delay and notify a second earphone of the second predetermined synchronization delay, wherein a second DSP circuit in the second earphone is arranged to determine the synchronization point according to a second time point of a second event and the second predetermined synchronization delay for the second earphone; and utilizing the UE to receive first uplink audio data from the first earphone and receive second uplink audio data from the second earphone.

20 Claims, 10 Drawing Sheets

(56) References Cited

FOREIGN PATENT DOCUMENTS

| | | | |
|---|---|---|---|
| CN | 109560913 | B | 8/2021 |
| CN | 113395623 | A | 9/2021 |
| CN | 113615208 | A | 11/2021 |
| JP | 6377557 | | 8/2018 |
| TW | 201732786 | A | 9/2017 |

* cited by examiner

METHOD AND APPARATUS FOR PERFORMING AUDIO ENHANCEMENT WITH AID OF TIMING CONTROL

BACKGROUND

The present invention is related to audio control, and more particularly, to a method for performing audio enhancement with aid of timing control, and associated apparatus such as an audio digital signal processing (DSP) circuit, an earphone and a user equipment (UE).

According to the related art, some wireless earphones can be implemented to have very small sizes, and may be referred to as wireless earbuds. A wireless earphone manufacturer may try to realize more functions for small wireless earphones (e.g., wireless earbuds) with built-in microphones. However, some problems may occur. For example, the hardware resources in the small wireless earphones may be very limited. In addition, more calculations corresponding to more functions may lead to more power consumption. As a result, it may be required to charge the small wireless earphones frequently. One or more conventional methods may be proposed to try solving the problems, but may cause additional problems such as some side effects. Thus, there is a need for a novel method and associated architecture to enhance audio control of an electronic system without introducing a side effect or in a way that is less likely to introduce a side effect.

SUMMARY

It is an objective of the present invention to provide a method for performing audio enhancement with aid of timing control, and to provide associated apparatus, in order to solve the above-mentioned problems.

It is another objective of the present invention to provide a method for performing audio enhancement with aid of timing control, and to provide associated apparatus, in order to achieve optimal performance.

At least one embodiment of the present invention provides a method for performing audio enhancement with aid of timing control, where the method can be applied to a user equipment (UE) wirelessly connected to a first earphone and a second earphone. The method may comprise: utilizing the UE to determine a first predetermined synchronization delay and notify the first earphone of the first predetermined synchronization delay, wherein a first digital signal processing (DSP) circuit in the first earphone is arranged to determine a synchronization point according to a first time point of a first event and the first predetermined synchronization delay for the first earphone; utilizing the UE to determine a second predetermined synchronization delay and notify the second earphone of the second predetermined synchronization delay, wherein a second DSP circuit in the second earphone is arranged to determine the synchronization point according to a second time point of a second event and the second predetermined synchronization delay for the second earphone; and utilizing the UE to receive first uplink audio data from the first earphone and receive second uplink audio data from the second earphone, wherein the first DSP circuit and the second DSP circuit are arranged to control timing of the first uplink audio data from the first earphone to the UE and timing of the second uplink audio data from the second earphone to the UE according to a first reference point for the first earphone and the second earphone, respectively, wherein the first reference point is determined at least according to the synchronization point.

At least one embodiment of the present invention provides a first earphone, where the first earphone and a second earphone can be wirelessly connected to a UE. The first earphone may comprise a wireless communications interface circuit, an audio input device, an audio output device, and a first DSP circuit that is coupled to the wireless communications interface circuit, the audio input device and the audio output device. The wireless communications interface circuit can be arranged to perform wireless communications with the UE for the first earphone, the audio input device can be arranged to input audio waves to generate input audio data, the audio output device can be arranged to output audio waves according to output audio data, and the first DSP circuit can be arranged to perform signal processing on any of the input audio data and the output audio data for the first earphone. For example, the first DSP circuit determines a synchronization point according to a first time point of a first event and a first predetermined synchronization delay for the first earphone, wherein the first predetermined synchronization delay is determined by the UE; a second DSP circuit in the second earphone determines the synchronization point according to a second time point of a second event and a second predetermined synchronization delay for the second earphone, wherein the second predetermined synchronization delay is determined by the UE; the first DSP circuit determines a first reference point according to the synchronization point and a third predetermined synchronization delay for the first earphone, wherein the third predetermined synchronization delay is greater than any of the first predetermined synchronization delay and the second predetermined synchronization delay; the second DSP circuit determines the first reference point according to the synchronization point and the third predetermined synchronization delay for the second earphone; and the first DSP circuit and the second DSP circuit controls timing of first uplink audio data from the first earphone to the UE and timing of second uplink audio data from the second earphone to the UE according to the first reference point for the first earphone and the second earphone, respectively.

At least one embodiment of the present invention provides a UE, where a first earphone and a second earphone can be wirelessly connected to the UE. The UE may comprise a wireless communications interface circuit and an audio DSP circuit that is coupled to the wireless communications interface circuit. The wireless communications interface circuit can be arranged to perform wireless communications with the first earphone and the second earphone for the UE, and the audio DSP circuit can be arranged to perform signal processing for the UE. For example, the UE is arranged to determine a first predetermined synchronization delay and notify the first earphone of the first predetermined synchronization delay, wherein a first DSP circuit in the first earphone is arranged to determine a synchronization point according to a first time point of a first event and the first predetermined synchronization delay for the first earphone; the UE is arranged to determine a second predetermined synchronization delay and notify the second earphone of the second predetermined synchronization delay, wherein a second DSP circuit in the second earphone is arranged to determine the synchronization point according to a second time point of a second event and the second predetermined synchronization delay for the second earphone; and the UE is arranged to receive first uplink audio data from the first earphone and receive second uplink audio data from the second earphone, wherein the first DSP circuit and the second DSP circuit are arranged to control timing of the first uplink audio data from the first earphone to the UE and timing of the second uplink audio data from the second earphone to the UE according to a first reference point for the first earphone and the second earphone, respectively, wherein the first reference point is determined at least according to the synchronization point.

It is an advantage of the present invention that, through proper timing control mechanism, the present invention method and associated apparatus can realize more functions for small wireless earphones (e.g., wireless earbuds) with built-in microphones without causing additional problems such as some side effects, and more particularly, can offload partial processing from the small wireless earphones onto the UE without reducing the performance of the partial processing. In addition, the present invention method and associated apparatus can make the whole system achieve optimal performance and guarantee better communications quality than any architecture in the related art. In comparison with the related art, the present invention method and associated apparatus can enhance audio control of an electronic system without introducing a side effect or in a way that is less likely to introduce a side effect.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
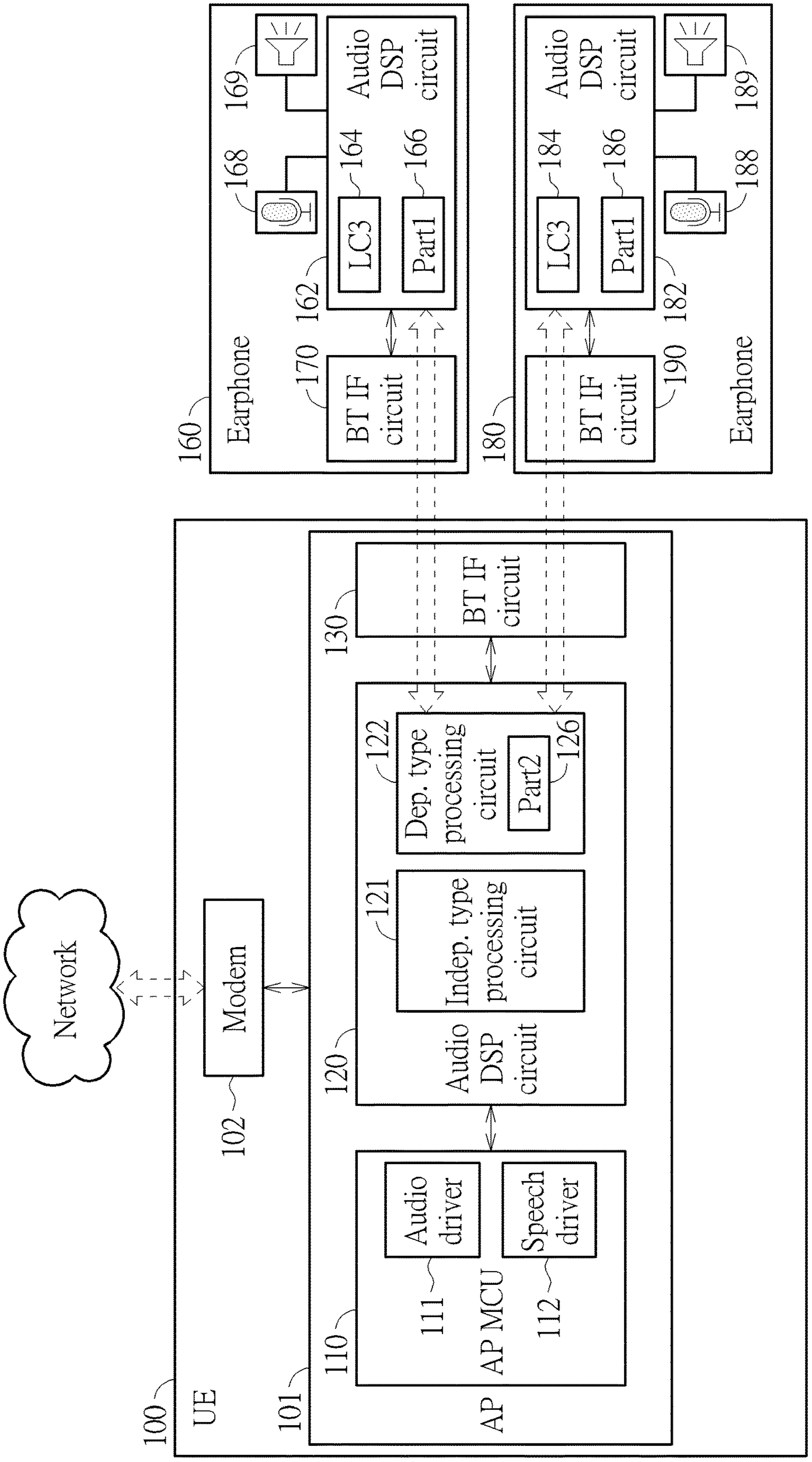
FIG. 1 is a diagram of an electronic system according to an embodiment of the present invention.

FIG. 1 is a diagram of an electronic system according to an embodiment of the present invention, where the electronic system may comprise a UE 100, a first earphone such as an earphone 160 and a second earphone such as an earphone 180, and the earphones 160 and 180 may be wirelessly connected to the UE 100. For better comprehension, the UE 100 may be implemented as a multifunctional mobile phone, and the earphones 160 and 180 may be implemented as small wireless earphones (e.g., wireless earbuds) with built-in microphones, but the present invention is not limited thereto. The electronic system may be configured to offload partial processing from the earphones 160 and 180 onto the UE 100 without reducing the performance of the partial processing.

In the architecture shown in FIG. 1, the UE 100 may comprise at least one processor (e.g., one or more processors) such as an application processor (AP) 101, a modulator-demodulator (Modem) 102 that is coupled to the AP 101, and one or more antennas (not shown) coupled to the Modem 102. The AP 101 may comprise a micro control unit (MCU) such as an AP MCU 110, an audio DSP circuit 120 and a wireless communications interface circuit such as a Bluetooth (BT) interface (IF) circuit 130, and the audio DSP circuit 120 may comprise an independent type processing circuit 121 and a dependent type processing circuit 122 (respectively labeled "Indep. type processing circuit" and "Dep. type processing circuit" for brevity), where the MCU such as the AP MCU 110, the audio DSP circuit 120 and the wireless communications interface circuit such as the BT IF circuit 130 may be coupled to each other through internal connections within the AP 101.

In addition, the first earphone such as the earphone 160 may comprise a first DSP circuit such as an audio DSP circuit 162, an audio input device 168, an audio output device 169, and a wireless communications interface circuit such as a BT IF circuit 170, where the audio input device 168, the audio output device 169 and this wireless communications interface circuit such as the BT IF circuit 170 may be coupled to the first DSP circuit such as the audio DSP circuit 162 as shown in the upper right of FIG. 1. For example, the first DSP circuit such as the audio DSP circuit 162 may comprise multiple sub-circuits such as a Low Complexity Communications Codec (LC3) processing circuit 164 and a part-one processing circuit 166 (respectively labeled "LC3" and "Part1" for brevity), the audio input device 168 may comprise at least one microphone (e.g., one or more microphones), and the audio output device 169 may comprise at least one speaker (e.g., one or more speakers).

Additionally, the second earphone such as the earphone 180 may comprise a second DSP circuit such as an audio DSP circuit 182, an audio input device 188, an audio output device 189, and a wireless communications interface circuit such as a BT IF circuit 190, where the audio input device 188, the audio output device 189 and this wireless communications interface circuit such as the BT IF circuit 190 may be coupled to the second DSP circuit such as the audio DSP circuit 182 as shown in the lower right of FIG. 1. For example, the second DSP circuit such as the audio DSP circuit 182 may comprise multiple sub-circuits such as an LC3 processing circuit 184 and a part-one processing circuit 186 (respectively labeled "LC3" and "Part1" for brevity), the audio input device 188 may comprise at least one microphone (e.g., one or more microphones), and the audio output device 189 may comprise at least one speaker (e.g., one or more speakers).

The AP 101 can be arranged to control operations of the UE 100, and the Modem 102 can be arranged to perform wireless communications with at least one network (e.g., one or more networks) for the UE 100, to allow the UE 100 to communicate with another UE through the aforementioned at least one network. For example, the user of the UE 100 and the user of the other UE may be regarded as a near-end user and a far-end user, respectively, and the two users may talk with each other using the UE 100 and the other UE. In addition, the AP MCU 110 running multiple program modules (e.g., one or more audio drivers 111 and one or more speech drivers 112) can be arranged to control the AP 101 in order to control the operations of the UE 100, the audio DSP circuit 120 can be arranged to perform signal processing such as audio data processing, etc., and the wireless communications interface circuit such as the BT IF circuit 130 can be arranged to perform wireless communications with the earphone 160 (e.g., the BT IF circuit 170 therein) and the earphone 180 (e.g., the BT IF circuit 190 therein), to allow the user of the UE 100 to hold a conversation with the far-end user in a hand-free manner with aid of the earphones 160 and 180.

In the first earphone such as the earphone 160, the wireless communications interface circuit such as the BT IF circuit 170 can be arranged to perform wireless communications with the UE 100 (e.g., the BT IF circuit 130 therein) for the earphone 160. The audio input device 168 can be arranged to input audio waves to generate input audio data of the earphone 160. For example, the input audio data of the earphone 160 may represent an initial version (e.g., raw audio data) of the uplink audio data corresponding to the earphone 160, and the UE 100 may send the uplink audio data corresponding to the earphone 160 toward the other UE through the aforementioned at least one network. In addition, the audio output device 169 can be arranged to output audio waves according to output audio data of the earphone 160. For example, the UE 100 may receive the downlink audio data corresponding to the earphone 160 from the other UE through the aforementioned at least one network, and the output audio data of the earphone 160 may represent a pre-processed version of the downlink audio data corresponding to the earphone 160, where the UE 100 may pre-process the downlink audio data corresponding to the earphone 160 to generate a pre-processed result thereof for being transmitted to the earphone 160 to be the pre-processed version of the downlink audio data, but the present invention is not limited thereto. For another example, the output audio data of the earphone 160 may represent a forwarded version of the downlink audio data corresponding to the earphone 160, where the UE 100 may forward the downlink audio data corresponding to the earphone 160 to be the forwarded version of the downlink audio data. Additionally, the first DSP circuit such as the audio DSP circuit 162 can be arranged to perform signal processing such as audio data processing, etc. on any of the input audio data and the output audio data for the earphone 160.

More particularly, both of the audio DSP circuit 120 and the audio DSP circuit 162 (e.g., the LC3 processing circuit 164 therein) can perform LC3 processing, such as coding and encoding regarding the LC3 format, to allow the BT IF circuit 130 in the UE 100 and the BT IF circuit 170 in the earphone 160 to communicate with each other through LC3 frames. Regarding a first uplink audio data path of the electronic system at the near-end user side, such as a data path that starts from the earphone 160, passes through the UE 100 and reaches the aforementioned at least one network, the audio DSP circuit 162 may utilize the part-one processing circuit 166 to perform part-one processing such as first audio data processing on the input audio data (e.g., the raw audio data) from the audio input device 168 to generate a first processing result as an intermediate version of the uplink audio data corresponding to the earphone 160, and utilize the BT IF circuit 170 to transmit the intermediate version of the uplink audio data corresponding to the earphone 160 to the UE 100 through one or more LC3 frames. The UE 100 may utilize the part-two processing circuit 126 (labeled "Part2" for brevity) in the dependent type processing circuit 122 of the audio DSP circuit 120 to perform part-two processing such as second audio data processing on the intermediate version of the uplink audio data corresponding to the earphone 160 to generate a second processing result to be the uplink audio data (e.g., a processed version thereof) corresponding to the earphone 160, and utilize the Modem 102 to transmit the uplink audio data corresponding to the earphone 160 to the other UE through the aforementioned at least one network. Regarding a first downlink audio data path of the electronic system at the near-end user side, such as a data path that starts from the aforementioned at least one network, passes through the UE 100 and reaches the earphone 160, the UE 100 may utilize the audio DSP circuit 120 to perform signal processing such as LC3 processing on the downlink audio data corresponding to the earphone 160, and utilize the BT IF circuit 130 to transmit the downlink audio data corresponding to the earphone 160 to the earphone 160 through one or more LC3 frames. The earphone 160 may utilize the audio DSP circuit 162 to perform signal processing such as volume adjustment, audio quality adjustment, etc. on the downlink audio data corresponding to the earphone 160 to generate the output audio data of the earphone 160, for being played back by the audio output device 169.

In the second earphone such as the earphone 180, the wireless communications interface circuit such as the BT IF circuit 190 can be arranged to perform wireless communications with the UE 100 (e.g., the BT IF circuit 130 therein) for the earphone 180. The audio input device 188 can be arranged to input audio waves to generate input audio data of the earphone 180. For example, the input audio data of the earphone 180 may represent an initial version (e.g., raw audio data) of the uplink audio data corresponding to the earphone 180, and the UE 100 may send the uplink audio data corresponding to the earphone 180 toward the other UE through the aforementioned at least one network. In addition, the audio output device 189 can be arranged to output audio waves according to output audio data of the earphone 180. For example, the UE 100 may receive the downlink audio data corresponding to the earphone 180 from the other UE through the aforementioned at least one network, and the output audio data of the earphone 180 may represent a pre-processed version of the downlink audio data corresponding to the earphone 180, where the UE 100 may pre-process the downlink audio data corresponding to the earphone 180 to generate a pre-processed result thereof for being transmitted to the earphone 180 to be the pre-processed version of the downlink audio data, but the present invention is not limited thereto. For another example, the output audio data of the earphone 180 may represent a forwarded version of the downlink audio data corresponding to the earphone 180, where the UE 100 may forward the downlink audio data corresponding to the earphone 180 to be the forwarded version of the downlink audio data. Additionally, the second DSP circuit such as the audio DSP circuit 182 can be arranged to perform signal processing such as audio data processing, etc. on any of the input audio data and the output audio data for the earphone 180.

More particularly, both of the audio DSP circuit 120 and the audio DSP circuit 182 (e.g., the LC3 processing circuit 184 therein) can perform LC3 processing, such as coding and encoding regarding the LC3 format, to allow the BT IF circuit 130 in the UE 100 and the BT IF circuit 190 in the earphone 180 to communicate with each other through LC3 frames. Regarding a second uplink audio data path of the electronic system at the near-end user side, such as a data path that starts from the earphone 180, passes through the UE 100 and reaches the aforementioned at least one network, the audio DSP circuit 182 may utilize the part-one processing circuit 186 to perform part-one processing such as the first audio data processing on the input audio data (e.g., the raw audio data) from the audio input device 188 to generate a first processing result as an intermediate version of the uplink audio data corresponding to the earphone 180, and utilize the BT IF circuit 190 to transmit the intermediate version of the uplink audio data corresponding to the earphone 180 to the UE 100 through one or more LC3 frames. The UE 100 may utilize the part-two processing circuit 126 (labeled "Part2" for brevity) in the dependent type processing circuit 122 of the audio DSP circuit 120 to perform part-two processing such as the second audio data processing on the intermediate version of the uplink audio data corresponding to the earphone 180 to generate a second processing result to be the uplink audio data (e.g., a processed version thereof) corresponding to the earphone 180, and utilize the Modem 102 to transmit the uplink audio data corresponding to the earphone 180 to the other UE through the aforementioned at least one network. Regarding a second downlink audio data path of the electronic system at the near-end user side, such as a data path that starts from the aforementioned at least one network, passes through the UE 100 and reaches the earphone 180, the UE 100 may utilize the audio DSP circuit 120 to perform signal processing such as LC3 processing on the downlink audio data corresponding to the earphone 180, and utilize the BT IF circuit 130 to transmit the downlink audio data corresponding to the earphone 180 to the earphone 180 through one or more LC3 frames. The earphone 180 may utilize the audio DSP circuit 182 to perform signal processing such as volume adjustment, audio quality adjustment, etc. on the downlink audio data corresponding to the earphone 180 to generate the output audio data of the earphone 180, for being played back by the audio output device 189.

Based on the architecture shown in FIG. 1, the electronic system may be configured to offload partial processing from the earphones 160 and 180 onto the UE 100 without reducing the performance of the partial processing, and more particularly, utilize the part-two processing circuit 126 in the dependent type processing circuit 122 of the audio DSP circuit 120 to perform the part-two processing such as the second audio data processing for the earphones 160 and 180 without reducing the performance of the second audio data processing, where the part-two processing can be taken as an example of the partial processing, but the present invention is not limited thereto. According to some embodiments, the UE 100 may enable the independent type processing circuit 121 and disable the dependent type processing circuit 122, and utilize the independent type processing circuit 121 to perform all of the part-one processing (e.g., the first audio data processing) and the part-two processing (e.g., the second audio data processing) for any set of wireless earphones among multiple sets of wireless earphones. For example, a first set of wireless earphones among the multiple sets of wireless earphones can be implemented to have sub-circuits that are the same as or similar to the sub-circuits of the earphones 160 and 180, respectively, and the UE 100 can be arranged to disable the part-one processing circuits 166 and 186 in the first set of wireless earphones. For another example, a second set of wireless earphones among the multiple sets of wireless earphones can be implemented to have sub-circuits that are similar to the sub-circuits of the earphones 160 and 180, respectively, and it is unnecessary to implement the part-one processing circuits 166 and 186 in the second set of wireless earphones.

According to some embodiments, a communications system may comprise the electronic system, as well as the aforementioned at least one network, and may further comprise the other UE, where the other UE may be implemented in the same or similar way as that of the UE 100. In the communications system, the uplink audio data of the UE 100 may be used as the downlink audio data of the other UE, and the uplink audio data of the other UE may be used as the downlink audio data of the UE 100. In addition, the first and the second uplink audio data paths of the UE 100 may be directed to the first and the second downlink audio data paths of the other UE, respectively, and the first and the second uplink audio data paths of the other UE may be directed to the first and the second downlink audio data paths of the UE 100, respectively. For brevity, similar descriptions for these embodiments are not repeated in detail here.

According to some embodiments, the BT IF circuits 130, 170 and 190 may conform to the BT specification, and more particularly, may be implemented according to the Bluetooth Low Energy (BLE) technology to make the UE 100 and the earphones 160 and 180 be BLE-compatible. For example, the earphones 160 and 180 can be implemented as BLE earphones. For brevity, similar descriptions for these embodiments are not repeated in detail here.

Figure 2:
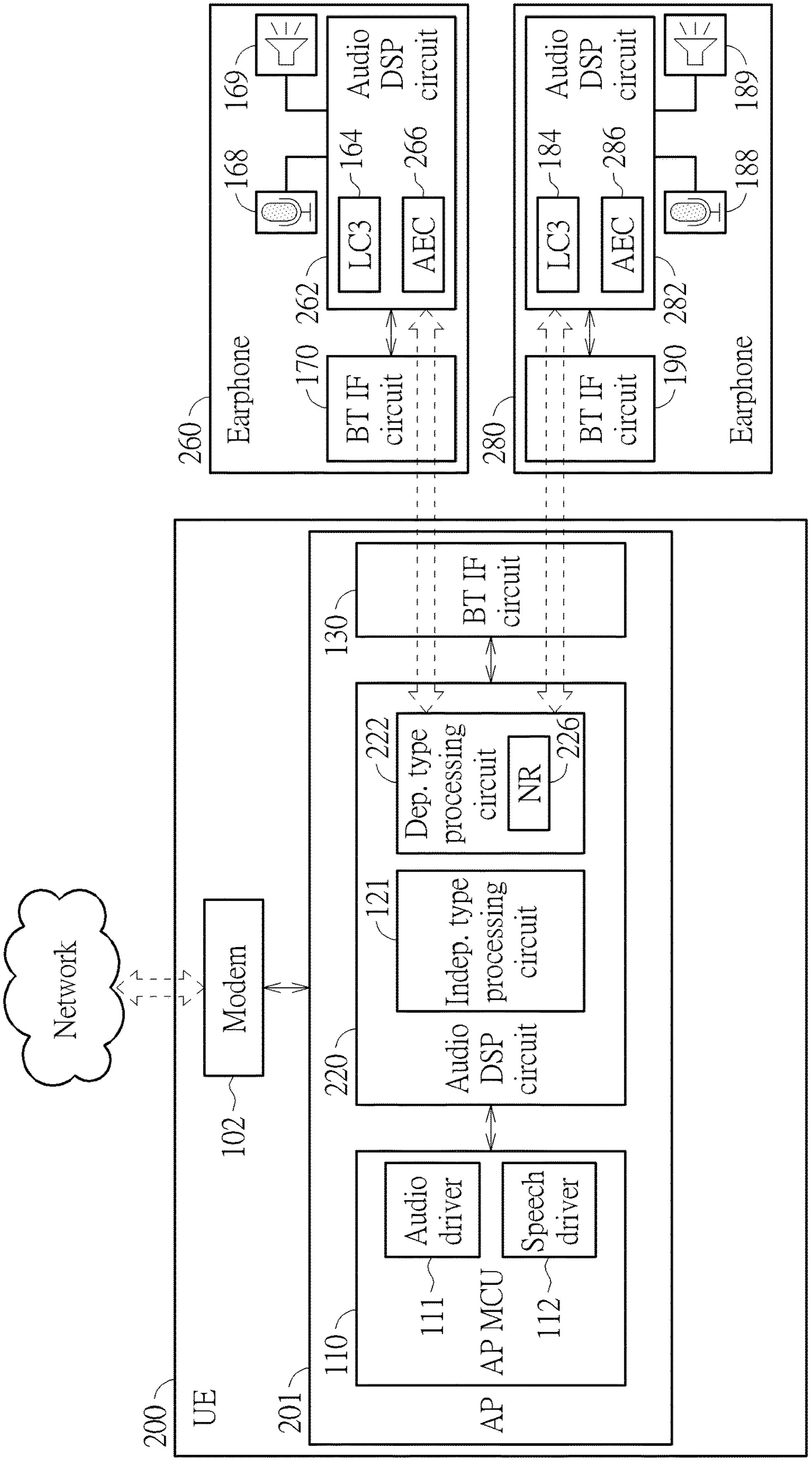
FIG. 2 illustrates an audio processing control scheme of a method for performing audio enhancement with aid of timing control according to an embodiment of the present invention, where the method can be applied to the electronic system shown in FIG. 1.

FIG. 2 illustrates an audio processing control scheme of a method for performing audio enhancement with aid of timing control according to an embodiment of the present invention, where the method can be applied to the electronic system shown in FIG. 1, and more particularly, the UE 100 and the first earphone and the second earphone (e.g., the earphones 160 and 180) wirelessly connected to the UE 100. Based on the audio processing control scheme, the part-one processing circuits 166 and 186 can be implemented as Acoustic Echo Cancellation (AEC) processing circuits 266 and 286 (labeled "AEC" for brevity) for performing AEC processing, respectively, and the part-two processing circuit 126 can be implemented as a noise reduction (NR) processing circuit 226 (labeled "NR" for brevity) for performing NR processing. In response to the change in the architecture, the associated numerals may be changed correspondingly. For example, the UE 100, the AP 101, the audio DSP circuits 120, 162 and 182, the dependent type processing circuit 122 and the earphones 160 and 180 may be replaced with the UE 200, the AP 201, the audio DSP circuits 220, 262 and 282, the dependent type processing circuit 222 and the earphones 260 and 280, respectively. For brevity, similar descriptions for this embodiment are not repeated in detail here.

In the architecture shown in FIG. 2, the part-one processing (e.g., the first audio data processing) can be implemented by way of the AEC processing, and the part-two processing (e.g., the second audio data processing) can be implemented by way of the NR processing, but the present invention is not limited thereto. According to some embodiments, the part-one processing (e.g., the first audio data processing) and/or the part-two processing (e.g., the second audio data processing) may vary.

Figure 3:
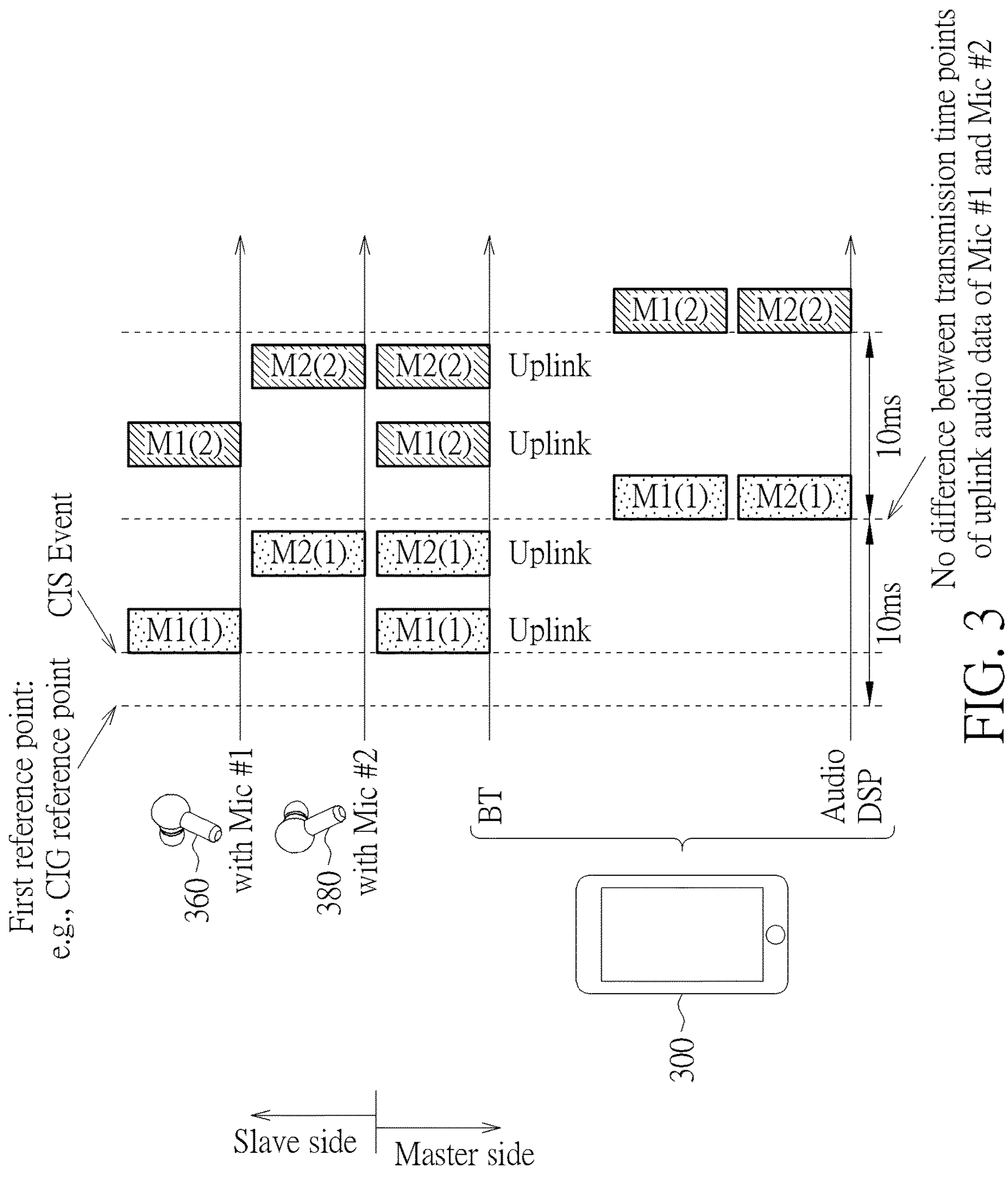
FIG. 3 illustrates a frame-based error prevention control scheme of the method for performing audio enhancement with aid of timing control according to an embodiment of the present invention.

FIG. 3 illustrates a frame-based error prevention control scheme of the method for performing audio enhancement with aid of timing control according to an embodiment of the present invention. For better comprehension, the UE 300 such as a multifunctional mobile phone, the earphone 360 with the microphone #1 (labeled "Mic #1" for brevity) embedded therein and the earphone 380 with the microphone #2 (labeled "Mic #2" for brevity) embedded therein can be taken as examples of the UE 100, the earphone 160 with the audio input device 168 embedded therein and the earphone 180 with the audio input device 188 embedded therein, respectively. Regarding the BT communications between the UE 300 and the earphones 360 and 380, the UE 300 can be regarded as the master side (e.g., the BT master device), and the earphones 360 and 380 can be regarded as the slave side (e.g., the BT slave devices).

As shown in FIG. 3, the UE 100 such as the UE 300 can perform proper timing control with respect to multiple time slots, and the earphones 160 and 180 such as the earphones 360 and 380 can perform their own timing control with aid of the UE 100 such as the UE 300, respectively, where the horizontal axis may represent time, and the multiple time slots may be divided in units of a predetermined length of time, such as 10 milliseconds (ms), but the present invention is not limited thereto. For example, the predetermined length of time may vary, and more particularly, may be equal to any of one or more other predetermined values. In addition, a series of uplink audio data {M1} such as uplink audio data M1(1), M1(2), etc. can be taken as examples of the uplink audio data corresponding to the earphone 160 (e.g., the earphone 360), and a series of uplink audio data {M2} such as uplink audio data M2(1), M2(2), etc. can be taken as examples of the uplink audio data corresponding to the earphone 180 (e.g., the earphone 380). For better comprehension, a set of uplink audio data {M1(i), M2(i)} having the same index i may represent the uplink audio data sampled at the same moment, and the index i may be an integer, but the present invention is not limited thereto.

In a first time slot among the multiple time slots, such as the time slot starting from a first reference point (e.g., a Connected Isochronous Group (CIG) reference point), the BT IF circuit 130 (e.g., the BT IF circuit of the UE 300, labeled "BT" for brevity) may receive the uplink audio data M1(1) from the earphone 160 (e.g., the earphone 360) and receive the uplink audio data M2(1) from the earphone 180 (e.g., the earphone 380), for being transmitted to the audio DSP circuit 120 (e.g., the audio DSP circuit of the UE 300, labeled "Audio DSP" for brevity) at the beginning of the next time slot such as a second time slot among the multiple time slots; in the second time slot, the BT IF circuit 130 (e.g., the BT IF circuit of the UE 300, labeled "BT" for brevity) may receive the uplink audio data M1(2) from the earphone 160 (e.g., the earphone 360) and receive the uplink audio data M2(2) from the earphone 180 (e.g., the earphone 380), for being transmitted to the audio DSP circuit 120 (e.g., the audio DSP circuit of the UE 300, labeled "Audio DSP" for brevity) at the beginning of the next time slot such as a third time slot among the multiple time slots; and the rest can be deduced by analogy.

Under control of the UE 100 such as the UE 300, the earphones 160 and 180 such as the earphones 360 and 380 can be aware of at least one portion (e.g., a portion or all) of the scheduling at the master side, such as the UE schedule, and more particularly, can convert downlink timing reference into uplink timing reference to correctly perform the associated timing control at the slave side. As a result, the uplink audio data M1(1) and M2(1) corresponding to a first moment (e.g., a first sampling time period) can be prepared at the slave side in time, for example, before the beginning time points of the Connected Isochronous Stream (CIS) events of the uplink audio data M1(1) and M2(1), respectively, and can be transmitted from the slave side to the master side in the same time slot, to allow the audio DSP circuit 120 (e.g., the audio DSP circuit of the UE 300, labeled "Audio DSP" for brevity) to perform audio data processing on the uplink audio data M1(1) and M2(1) corresponding to the same moment (e.g., the same sampling time period); the uplink audio data M1(2) and M2(2) corresponding to a second moment (e.g., a second sampling time period) can be prepared at the slave side in time, for example, before the beginning time points of the CIS events of the uplink audio data M1(2) and M2(2), respectively, and can be transmitted from the slave side to the master side in the same time slot, to allow the audio DSP circuit 120 (e.g., the audio DSP circuit of the UE 300, labeled "Audio DSP" for brevity) to perform audio data processing on the uplink audio data M1(2) and M2(2) corresponding to the same moment (e.g., the same sampling time period); and the rest can be deduced by analogy. Therefore, the present invention method and associated apparatus can prevent occurrence of any frame-based error, and more particularly, can guarantee that there is no difference between the respective transmission time points of the respective uplink audio data M1(i) and M2(i) (e.g., the uplink audio data M1(1) and M2(1)) of the Mic #1 and the Mic #2. For brevity, similar descriptions for this embodiment are not repeated in detail here.

According to some embodiments, the uplink audio data M1(i) and M2(i) (e.g., the uplink audio data M1(1) and M2(1)) may represent a set of stereo audio data corresponding to the same moment (e.g., the same sampling time period). For brevity, similar descriptions for these embodiments are not repeated in detail here.

According to some embodiments, the first earphone such as the earphone 160 (e.g., the earphone 360) and the second earphone such as the earphone 180 (e.g., the earphone 380) can be referred to as the earphones #1 and #2, respectively, and the audio DSP circuit 120 (e.g., the audio DSP circuit in the UE 300), the first DSP circuit such as the audio DSP circuit 162 (e.g., the audio DSP circuit in the earphone 360) and the second DSP circuit such as the audio DSP circuit 182 (e.g., the audio DSP circuit in the earphone 380) can be referred to as the DSP circuits #0, #1 and #2, respectively.

Figure 4:
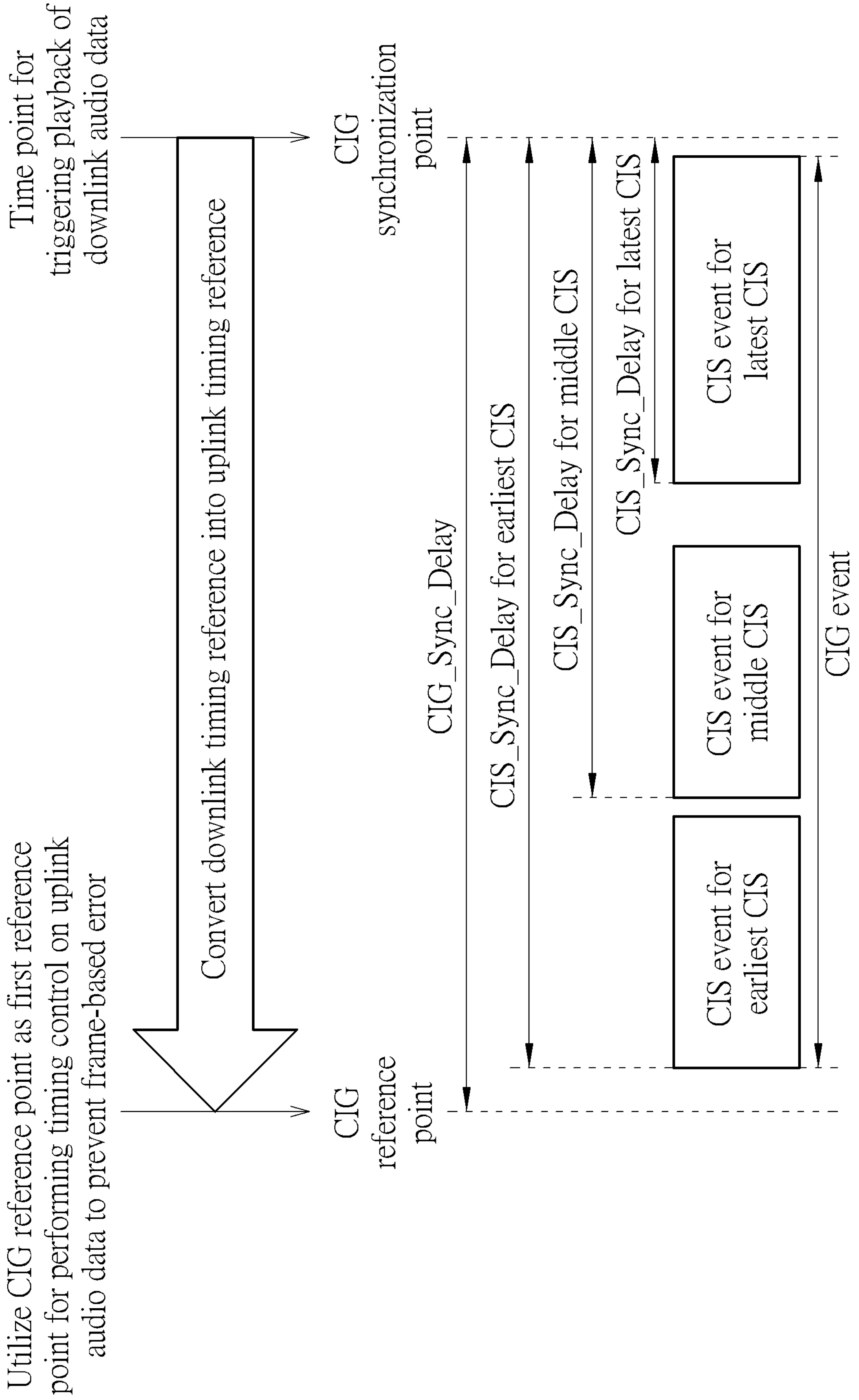
FIG. 4 illustrates some implementation details of the frame-based error prevention control scheme shown in FIG. 3 according to an embodiment of the present invention.

FIG. 4 illustrates some implementation details of the frame-based error prevention control scheme shown in FIG. 3 according to an embodiment of the present invention. For better comprehension, a CIG event may comprise multiple CIS events such as $N_{EVENT}$ CIS events, and the event count $N_{EVENT}$ of the multiple CIS events may be an integer that is greater than one. More particularly, the multiple CIS events may comprise a CIS event for the earliest CIS, at least one intermediate CIS event such as a CIS event for a middle CIS, and a CIS event for the latest CIS, where the respective synchronization delays {CIS_Sync_Delay} of the multiple CIS events, such as the synchronization delays CIS_Sync_Delay(1), CIS_Sync_Delay(2) and CIS_Sync_Delay($N_{EVENT}$) respectively corresponding to the earliest CIS, the middle CIS and the latest CIS (respectively labeled "CIS_Sync_Delay for earliest CIS", "CIS_Sync_Delay for middle CIS" and "CIS_Sync_Delay for latest CIS" for brevity), as well as the CIG synchronization delay CIG_Sync_Delay of the CIG event, can be determined by the UE 100 such as the UE 300 according to the scheduling at the master side, such as the UE schedule. In addition, the set of uplink audio data {M1(i), M2(i)} having the same index i (e.g., the uplink audio data M1(1) and M2(1)) may represent the uplink audio data sampled at the same moment, and the CIS event for the earliest CIS and the CIS event for the middle CIS can be taken as examples of the CIS events of the uplink audio data M1(i) and M2(i), respectively, but the present invention is not limited thereto.

For example, the electronic system can perform audio enhancement with aid of timing control, and more particularly, can perform the following operations:

(1) the DSP circuit #1 in the earphone #1 can determine a synchronization point (e.g., the CIG synchronization point of the CIG event) according to a first time point of a first event (e.g., the CIS event for the earliest CIS) and a first predetermined synchronization delay (e.g., the synchronization delay CIS_Sync_Delay(1) corresponding to the earliest CIS) for the earphone #1, where the first predetermined synchronization delay is determined by the UE 100 such as the UE 300;

(2) the DSP circuit #2 in the earphone #2 can determine the synchronization point (e.g., the CIG synchronization point of the CIG event) according to a second time point of a second event (e.g., the CIS event for the middle CIS) and a second predetermined synchronization delay (e.g., the synchronization delay CIS_Sync_Delay(2) corresponding to the middle CIS) for the earphone #2, where the second predetermined synchronization delay is determined by the UE 100 such as the UE 300;

(3) the DSP circuit #1 can determine the first reference point (e.g., the CIG reference point) according to the synchronization point (e.g., the CIG synchronization point of the CIG event) and a third predetermined synchronization delay (e.g., the CIG synchronization delay CIG_Sync_Delay of the CIG event) for the earphone #1, where the third predetermined synchronization delay is greater than any of the first predetermined synchronization delay and the second predetermined synchronization delay (e.g., CIG_Sync_Delay>CIS_Sync_Delay(1) and CIG_Sync_Delay>CIS_Sync_Delay(2)), and is also determined by the UE 100 such as the UE 300;

(4) the DSP circuit #2 can determine the first reference point (e.g., the CIG reference point) according to the synchronization point (e.g., the CIG synchronization point of the CIG event) and the third predetermined synchronization delay (e.g., the CIG synchronization delay CIG_Sync_Delay of the CIG event) for the earphone #2; and (5) the DSP circuits #1 and #2 can control the timing of the uplink audio data M1(i) (e.g., the uplink audio data M1(1)) from the earphone #1 to the UE 100 such as the UE 300 and the timing of the uplink audio data M2(i) (e.g., the uplink audio data M2(1)) from the earphone #2 to the UE 100 such as the UE 300 according to the first reference point (e.g., the CIG reference point) for the earphone #1 and the earphone #2, respectively;

where the earphones #1 and #2 can perform their own timing control with aid of the UE 100 such as the UE 300, respectively. The UE 100 such as the UE 300 can send the first predetermined synchronization delay (e.g., the synchronization delay CIS_Sync_Delay(1) corresponding to the earliest CIS) to the earphone #1 in advance, send the second predetermined synchronization delay (e.g., the synchronization delay CIS_Sync_Delay(2) corresponding to the middle CIS) to the earphone #2 in advance, and send the third predetermined synchronization delay (e.g., the CIG synchronization delay CIG_Sync_Delay of the CIG event) to the earphones #1 and #2 in advance, to make the earphones #1 and #2 be aware of the scheduling at the master side, such as the UE schedule, and therefore make the earphones #1 and #2 be capable of performing their own timing control correctly.

As shown in FIG. 4, the synchronization point (e.g., the CIG synchronization point of the CIG event) is later than each of the first time point (e.g., the beginning time point of the CIS event for the earliest CIS) and the second time point (e.g., the beginning time point of the CIS event for the middle CIS), where a time difference between the synchronization point and the first time point is equal to the first predetermined synchronization delay (e.g., the synchronization delay CIS_Sync_Delay(1) corresponding to the earliest CIS), and a time difference between the synchronization point and the second time point is equal to the second predetermined synchronization delay (e.g., the synchronization delay CIS_Sync_Delay(2) corresponding to the middle CIS). Based on the frame-based error prevention control scheme, the synchronization point (e.g., the CIG synchronization point of the CIG event) can be used as a downlink playback reference time point, and can further be used as an intermediate reference point for the earphone #1 (e.g., the DSP circuit #1) and the earphone #2 (e.g., the DSP circuit #2) to perform timing control on the uplink audio data M1(i) (e.g., the uplink audio data M1(1)) and the uplink audio data M2(i) (e.g., the uplink audio data M2(1)) at the slave side, respectively. The earphone #1 (e.g., the DSP circuit #1) can determine the synchronization point (e.g., the CIG synchronization point of the CIG event) at least according to the first predetermined synchronization delay (e.g., the synchronization delay CIS_Sync_Delay(1) corresponding to the earliest CIS) and utilize the synchronization point as the time point for triggering the playback of the downlink audio data S1(i) (e.g., the downlink audio data S1(1)) corresponding to the earphone #1, and further convert the downlink timing reference into the uplink timing reference, and more particularly, utilize the CIG reference point as the first reference point for performing timing control on the uplink audio data M1(i) (e.g., the uplink audio data M1(1)) to prevent the frame-based error. Similarly, the earphone #2 (e.g., the DSP circuit #2) can determine the synchronization point (e.g., the CIG synchronization point of the CIG event) at least according to the second predetermined synchronization delay (e.g., the synchronization delay CIS_Sync_Delay(2) corresponding to the middle CIS) and utilize the synchronization point as the time point for triggering the playback of the downlink audio data S2(i) (e.g., the downlink audio data S2(1)) corresponding to the earphone #2, and further convert the downlink timing reference into the uplink timing reference, and more particularly, utilize the CIG reference point as the first reference point for performing timing control on the uplink audio data M2(i) (e.g., the uplink audio data M2(1)) to prevent the frame-based error. For brevity, similar descriptions for this embodiment are not repeated in detail here.

According to some embodiments, the downlink playback reference point may represent a BLE True Wireless Stereo (TWS) downlink playback reference time point. For brevity, similar descriptions for these embodiments are not repeated in detail here.

Figure 5:
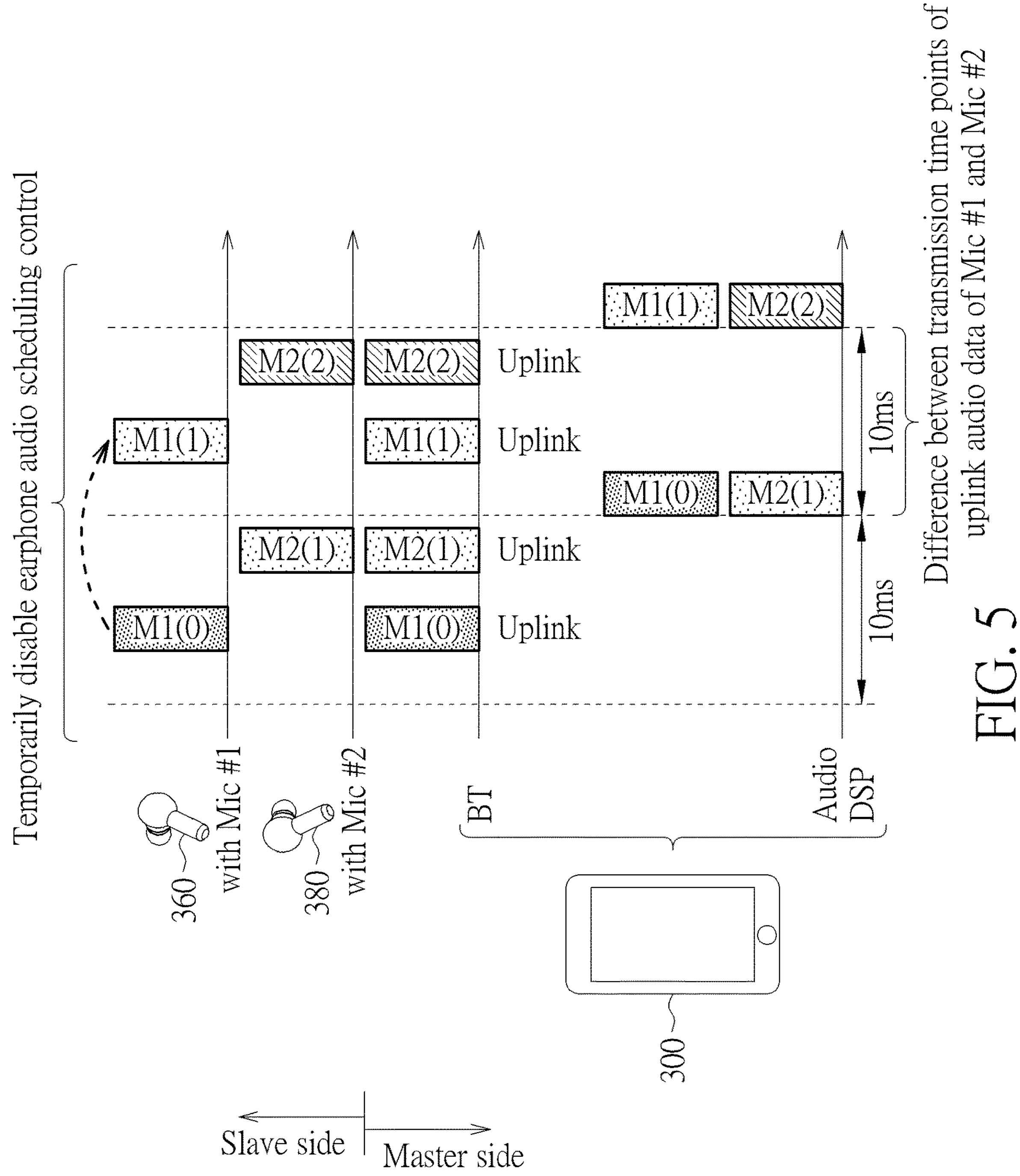
FIG. 5 illustrates an example of a frame-based error that may occur in a situation where earphone audio scheduling control is temporarily disabled.

FIG. 5 illustrates an example of a frame-based error that may occur in a situation where the earphone audio scheduling control is temporarily disabled. In this situation, the earphone #1 (e.g., the DSP circuit #1) may be not aware of the scheduling at the master side, such as the UE schedule, and therefore may fail to prepare the uplink audio data M1(i) (e.g., the uplink audio data M1(1)) in time. As shown in FIG. 5, the uplink audio data M1(i) (e.g., the uplink audio data M1(1)) that is supposed to be transmitted to master side from the slave side in the $i^{th}$ time slot (e.g., the first time slot) may be replaced by the previous uplink audio data such as the uplink audio data M1(i−1) (e.g., the uplink audio data M1(0)). As a result, the frame-based error occurs, and there is a difference between the respective transmission time points of the respective uplink audio data M1(i) and M2(i) (e.g., the uplink audio data M1(1) and M2(1)) of the Mic #1 and the Mic #2.

According to some embodiments, the earphones #1 and #2 at the slave side can monitor the sampling time offsets {Offset1} of the series of uplink audio data {M1} (e.g., the sampling time offset Offset1(i) of the uplink audio data M1(i)) and the sampling time offsets {Offset2} of the series of uplink audio data {M2} (e.g., the sampling time offset Offset2(i) of the uplink audio data M2(i)), respectively, and provide the sampling time offsets {Offset1} and {Offset2} to the master side, to allow the UE 100 such as the UE 300 to perform sampling time calibration on the series of uplink audio data {M1} and the series of uplink audio data {M2} according to the sampling time offsets {Offset1} and {Offset2}, respectively, in order to prevent occurrence of any sample-based error, where the sampling time calibration may comprise audio sample interpolation. For example, the earphone #1 can utilize the DSP circuit #1 to complete the processing of the uplink audio data M1(i) (e.g., the uplink audio data M1(1)), such as the LC3 processing and the part-one processing of the uplink audio data M1(i), before the first time point of the first event (e.g., the CIS event for the earliest CIS), and to transmit the uplink audio data M1(i) (e.g., the uplink audio data M1(1)), as well as the sampling time offset Offset1(i) of the uplink audio data M1(i), to the UE 100 such as the UE 300 in a first secondary time slot within the $i^{th}$ time slot (e.g., the first time slot). For another example, the earphone #2 can utilize the DSP circuit #2 to complete the processing of the uplink audio data M2(i) (e.g., the uplink audio data M2(1)), such as the LC3 processing and the part-one processing of the uplink audio data M2(i), before the second time point of the second event (e.g., the CIS event for the middle CIS), and to transmit the uplink audio data M2(i) (e.g., the uplink audio data M2(1)), as well as the sampling time offset Offset2(i) of the uplink audio data M2(i), to the UE 100 such as the UE 300 in a second secondary time slot within the $i^{th}$ time slot (e.g., the first time slot).

Figure 6:
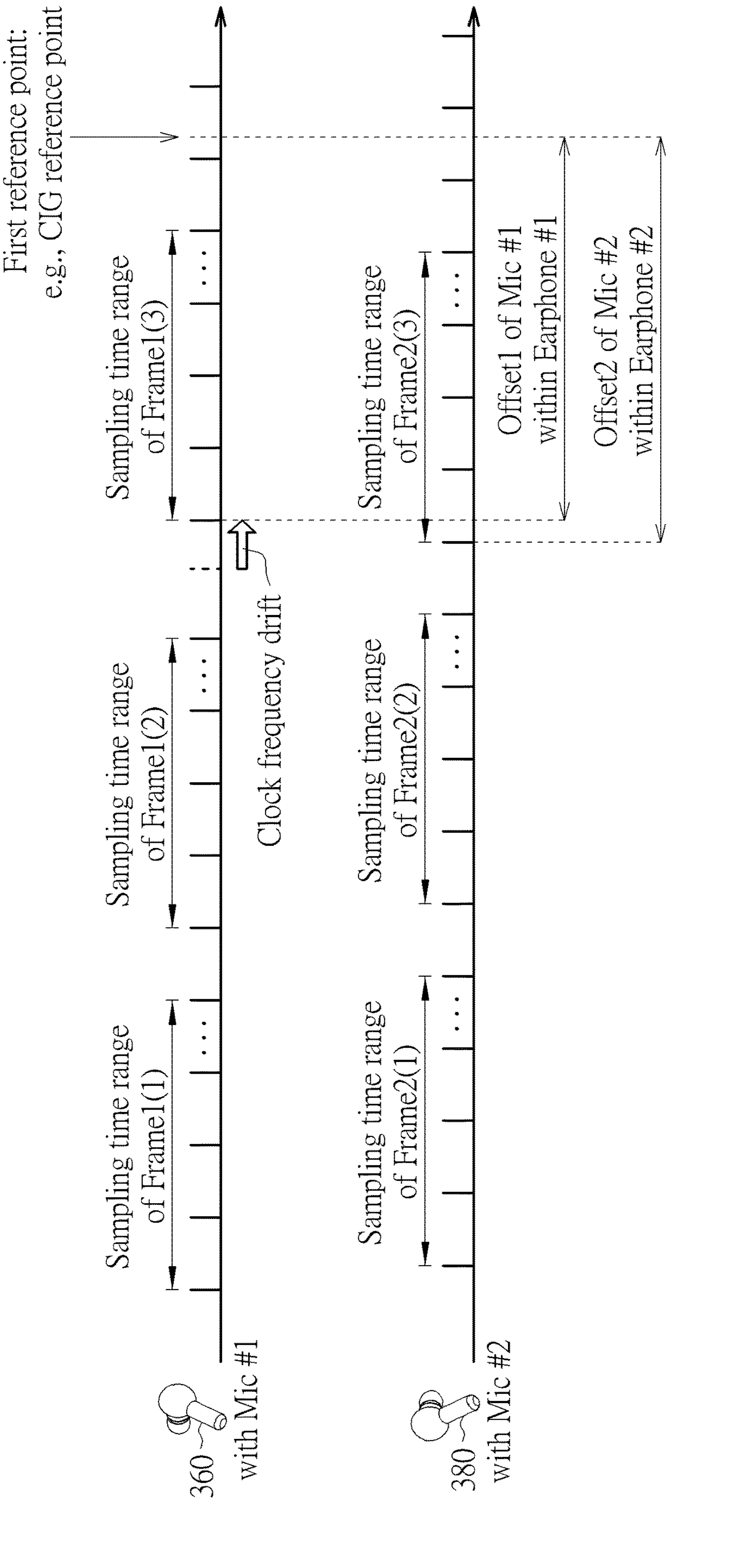
FIG. 6 illustrates a sample-based error prevention control scheme of the method for performing audio enhancement with aid of timing control according to an embodiment of the present invention.

FIG. 6 illustrates a sample-based error prevention control scheme of the method for performing audio enhancement with aid of timing control according to an embodiment of the present invention. For better comprehension, multiple sets of vertical line segments corresponding to multiple audio frames {Frame1} (e.g., the audio frames Frame1(1), Frame1 (2) and Frame1(3)) may be illustrated on the horizontal axis (e.g., the time axis) in the upper half of FIG. 6 to indicate the audio samples of the series of uplink audio data {M1} (e.g., the uplink audio data M1(1), M1(2) and M1(3)), respectively, and multiple sets of vertical line segments corresponding to multiple audio frames {Frame2} (e.g., the audio frames Frame2(1), Frame2(2) and Frame2(3)) may be illustrated on the horizontal axis (e.g., the time axis) in the lower half of FIG. 6 to indicate audio samples of the series of uplink audio data {M2} (e.g., the uplink audio data M2(1), M2(2) and M2(3)), respectively.

In an ideal case, there is no clock frequency drift of the clock source in any of the earphones #1 and #2. For example, the earphone #1 can generate the audio frames {Frame1} such as the audio frames Frame1(1), Frame1(2), Frame1(3), etc. in a periodic manner, and the earphone #2 can generate the audio frames {Frame2} such as the audio frames Frame2(1), Frame2(2), Frame2(3), etc. in a periodic manner. In addition, the sampling time ranges of the audio frames Frame1(1), Frame1(2), Frame1(3), etc. can be equal to each other, and the sampling time ranges of the audio frames Frame2(1), Frame2(2), Frame2(3), etc. can be equal to each other, where any of the sampling time ranges of the audio frames Frame1(1), Frame1(2), Frame1(3), etc. can be equal to any of the sampling time ranges of the audio frames Frame2(1), Frame2(2), Frame2(3), etc.

Although the clock frequency drift may occur in a real case such as that shown in FIG. 6, the earphones #1 and #2 at the slave side can monitor the sampling time offset Offset1(i) such as the sampling time offsets Offset1(1), Offset1(2), Offset1(3), etc. and the sampling time offset Offset2(i) such as the sampling time offsets Offset2(1), Offset2(2), Offset2(3), etc., respectively, and provide the sampling time offsets Offset1(i) and Offset2(i) to the master side, to allow the UE 100 such as the UE 300 to perform the sampling time calibration (e.g., the audio sample interpolation) on the uplink audio data M1(i) and M2(i) according to the sampling time offsets Offset1(i) and Offset2(i), respectively, to make the audio samples of the uplink audio data M1(i) and M2(i) be calibrated with respect to time (e.g., as if these audio samples were sampled according to a stable and common clock source at the master side), in order to prevent occurrence of any sample-based error.

For example, the earphone #1 can utilize the DSP circuit #1 to complete the processing of the uplink audio data M1(i) (e.g., the uplink audio data M1(3)) before the first time point of the first event (e.g., the CIS event for the earliest CIS), and to transmit the uplink audio data M1(i) (e.g., the uplink audio data M1(3)), as well as the sampling time offset Offset1(i) of the uplink audio data M1(i) (e.g., the sampling time offset Offset1(3) of the uplink audio data M1(3), labeled "Offset1 of Mic #1 within Earphone #1" for better comprehension), to the UE 100 such as the UE 300 in the first secondary time slot within the $i^{th}$ time slot (e.g., the third time slot). For another example, the earphone #2 can utilize the DSP circuit #2 to complete the processing of the uplink audio data M2(i) (e.g., the uplink audio data M2(3)) before the second time point of the second event (e.g., the CIS event for the middle CIS), and to transmit the uplink audio data M2(i) (e.g., the uplink audio data M2(3)), as well as the sampling time offset Offset2(i) of the uplink audio data M2(i) (e.g., the sampling time offset Offset2(3) of the uplink audio data M2(3), labeled "Offset2 of Mic #2 within Earphone #2" for better comprehension), to the UE 100 such as the UE 300 in the second secondary time slot within the $i^{th}$ time slot (e.g., the third time slot).

As shown in FIG. 6, the sampling time offset Offset1(i) (e.g., the sampling time offset Offset1(3), labeled "Offset1 of Mic #1 within Earphone #1") may represent a time difference between the first reference point (e.g., the CIG reference point) and the start sampling time of multiple audio samples within the uplink audio data M1(i) (e.g., the uplink audio data M1(3)), such as the time difference between the CIG reference point and the beginning time point of the sampling time range of the audio frame Frame1(i) (e.g., the audio frame Frame1(3)), and the sampling time offset Offset2(i) (e.g., the sampling time offset Offset2(3), labeled "Offset2 of Mic #2 within Earphone #2") may represent a time difference between the first reference point (e.g., the CIG reference point) and the start sampling time of multiple audio samples within the uplink audio data M2(i) (e.g., the uplink audio data M2(3)), such as the time difference between the CIG reference point and the beginning time point of the sampling time range of the audio frame Frame2(i) (e.g., the audio frame Frame2(3)).

Based on the sample-based error prevention control scheme, the UE 100 such as the UE 300 can utilize the DSP circuit #0 (e.g., the audio DSP circuit 120 in the UE 100) to perform the sampling time calibration such as the audio sample interpolation on any of the uplink audio data M1(i) (e.g., the uplink audio data M1(3)) and the uplink audio data M2(i) (e.g., the uplink audio data M2(3)) according to the sampling time offset Offset1(i) (e.g., the sampling time offset Offset1(3), labeled "Offset1 of Mic #1 within Earphone #1") and the sampling time offset Offset2(i) (e.g., the sampling time offset Offset2(3), labeled "Offset2 of Mic #2 within Earphone #2"), in order to prevent the sample-based error. For brevity, similar descriptions for this embodiment are not repeated in detail here.

According to some embodiments, in response to receiving any uplink audio data among the uplink audio data M1(i) (e.g., the uplink audio data M1(3)) and the uplink audio data M2(i) (e.g., the uplink audio data M2(3)) being unsuccessful, the UE 100 such as the UE 300 can utilize the DSP circuit #0 (e.g., the audio DSP circuit 120 in the UE 100) to convert the received uplink audio data (e.g., the other uplink audio data) among the uplink audio data M1(i) (e.g., the uplink audio data M1(3)) and the uplink audio data M2(i) (e.g., the uplink audio data M2(3)) into an emulated uplink audio data according to the sampling time offset Offset1(i) (e.g., the sampling time offset Offset1(3)) and the sampling time offset Offset2(i) (e.g., the sampling time offset Offset2(3)), to be a replacement of the any uplink audio data. For brevity, similar descriptions for these embodiments are not repeated in detail here.

According to some embodiments, the first time point of the first event (e.g., the CIS event for the earliest CIS) and the second time point of the second event (e.g., the CIS event for the middle CIS) may represent the beginning time points of the first secondary time slot and the second secondary time slot within the $i^{th}$ time slot (e.g., the $i^{th}$ isochronous (ISO) interval) corresponding to the same audio data frame at the master side, respectively, where the UE 100 such as the UE 300 may transmit (TX) the downlink audio data S1(i) to the earphone #1 and receive (RX) the uplink audio data M1(i) from the earphone #1 in the first secondary time slot within the $i^{th}$ time slot, and may transmit (TX) the downlink audio data S2(i) to the earphone #2 and receive (RX) the uplink audio data M2(i) from the earphone #2 in the second secondary time slot within the $i^{th}$ time slot, but the present invention is not limited thereto. For brevity, similar descriptions for these embodiments are not repeated in detail here.

Figure 7:
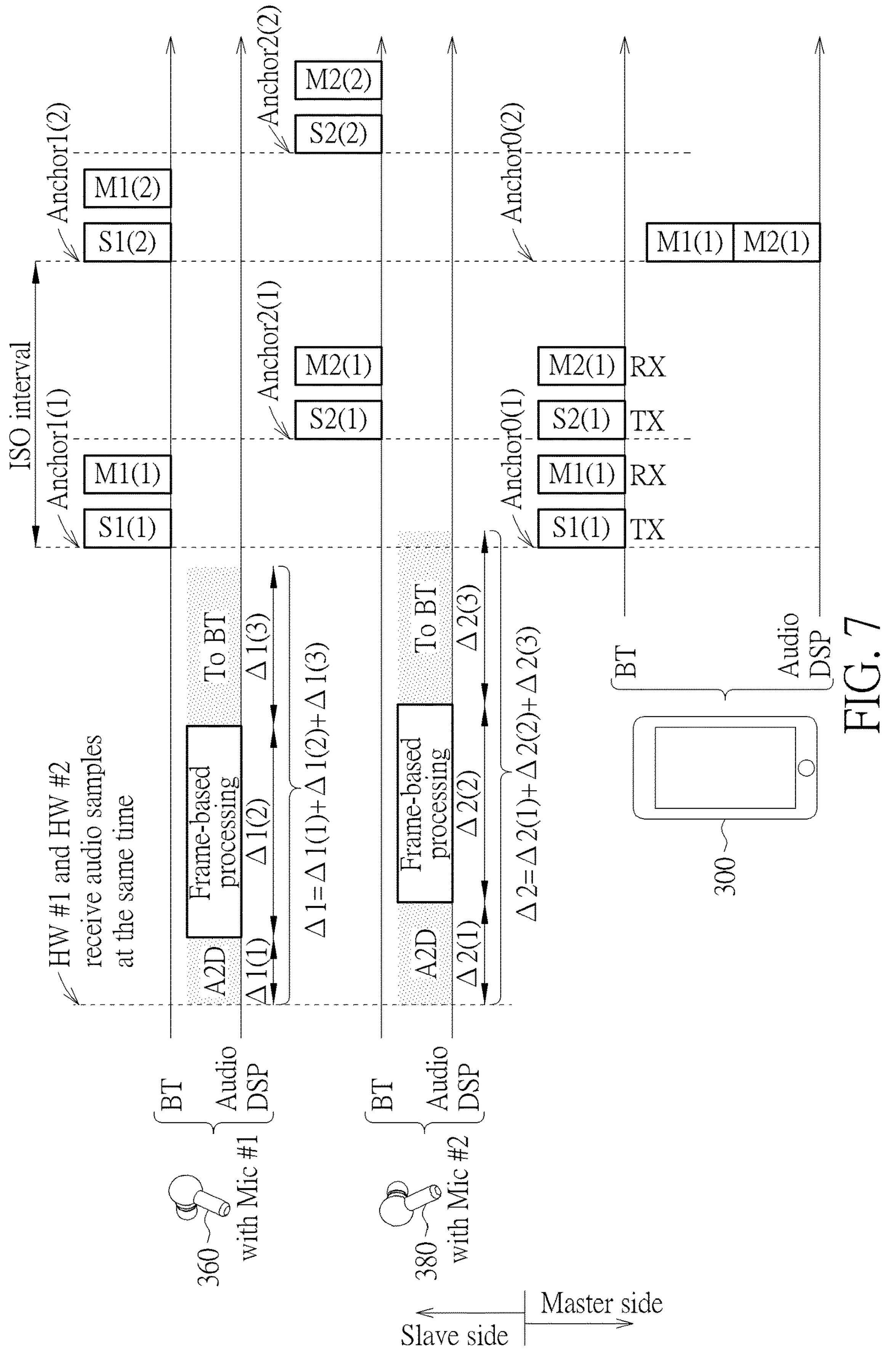
FIG. 7 illustrates a UE-schedule-aware earphone timing control scheme of the method for performing audio enhancement with aid of timing control according to an embodiment of the present invention.

FIG. 7 illustrates a UE-schedule-aware earphone timing control scheme of the method for performing audio enhancement with aid of timing control according to an embodiment of the present invention. For better comprehension, the $i^{th}$ time slot such as the $i^{th}$ ISO interval can be illustrated as the ISO interval shown in FIG. 7 for the case of i=1. Based on the UE-schedule-aware earphone timing control scheme, the uplink audio data M1(i) and M2(i) can be transmitted from the slave side to the master side in time, and more particularly, can be transmitted from the earphones #1 and #2 to the UE 100 such as the UE 300 within the $i^{th}$ time slot (e.g., the $i^{th}$ ISO interval) among the multiple time slots (e.g., multiple ISO intervals), respectively. In addition, the electronic system can utilize the DSP circuits #1 and #2 to control the timing of the uplink audio data M1(i) (e.g., the uplink audio data M1(1)) from the earphone #1 to the UE 100 such as the UE 300 and the timing of the uplink audio data M2(i) (e.g., the uplink audio data M2(1)) from the earphone #2 to the UE 100 such as the UE 300 according to the first reference point (e.g., the CIG reference point) for the earphones #1 and #2, respectively.

For example, the electronic system can utilize the DSP circuit #1 (e.g., the audio DSP circuit 162 such as that in the earphone 360, labeled "Audio DSP" for brevity) to complete the processing of the uplink audio data M1(i) (e.g., the uplink audio data M1(1)) and to complete the transmission of the uplink audio data M1(i) from the DSP circuit #1 to the BT IF circuit (labeled "BT" for brevity) in the earphone #1 before the first time point, and more particularly, before the time point of the anchor Anchor1(i) (e.g., the anchor Anchor1(1)) of the earphone #1, for transmitting the uplink audio data M1(i) (e.g., the uplink audio data M1(1)) to the UE 100 such as the UE 300 in the first secondary time slot within the $i^{th}$ time slot, and operations of the preparation of the uplink audio data M1(i) (e.g., the uplink audio data M1(1)) at the slave side may comprise:

(1) utilizing an analog-to-digital convertor (ADC) within the DSP circuit #1 to perform analog-to-digital conversion (labeled "A2D" for brevity) within a first sub-processing time period $\Delta1(1)$ of a first processing time period $\Delta1$;
(2) utilizing the LC3 processing circuit and the part-one processing circuit within the DSP circuit #1 to perform the LC3 processing and the part-one processing respectively (labeled "Frame-based processing" for brevity) within a second sub-processing time period $\Delta1(2)$ of the first processing time period $\Delta1$; and
(3) utilizing the DSP circuit #1 to transmit the uplink audio data M1(i) (e.g., the uplink audio data M1(1)) to the BT IF circuit in the earphone #1 (labeled "To BT" for brevity) within a third sub-processing time period $\Delta1(3)$ of the first processing time period $\Delta1$; where $\Delta1=\Delta1(1)+\Delta1(2)+\Delta1(3)$.

For another example, the electronic system can utilize the DSP circuit #2 (e.g., the audio DSP circuit 182 such as that in the earphone 380, labeled "Audio DSP" for brevity) to complete the processing of the uplink audio data M2(i) (e.g., the uplink audio data M2(1)) and to complete the transmission of the uplink audio data M2(i) from the DSP circuit #2 to the BT IF circuit (labeled "BT" for brevity) in the earphone #2 before the second time point, and more particularly, before the time point of the anchor Anchor2(i) (e.g., the anchor Anchor2(1)) of the earphone #2, for transmitting the uplink audio data M2(i) (e.g., the uplink audio data M2(1)) to the UE 100 such as the UE 300 in the second secondary time slot within the $i^{th}$ time slot, and operations of the preparation of the uplink audio data M2(i) (e.g., the uplink audio data M2(1)) at the slave side may comprise:

(1) utilizing an ADC within the DSP circuit #2 to perform analog-to-digital conversion (labeled "A2D" for brevity) within a first sub-processing time period $\Delta2(1)$ of a second processing time period $\Delta2$;
(2) utilizing the LC3 processing circuit and the part-one processing circuit within the DSP circuit #2 to perform the LC3 processing and the part-one processing respectively (labeled "Frame-based processing" for brevity) within a second sub-processing time period $\Delta2(2)$ of the second processing time period $\Delta2$; and
(3) utilizing the DSP circuit #2 to transmit the uplink audio data M2(i) (e.g., the uplink audio data M2(1)) to the BT IF circuit in the earphone #2 (labeled "To BT" for brevity) within a third sub-processing time period $\Delta2(3)$ of the second processing time period $\Delta2$; where $\Delta2=\Delta2(1)+\Delta2(2)+\Delta2(3)$.

In addition, the hardware (HW) #1 (e.g., the ADC within the DSP circuit #1) of the earphone #1 and the HW #2 (e.g., the ADC within the DSP circuit #2) of the earphone #2 may receive audio samples at the same time, and the first processing time period Δ1 and the second processing time period Δ2 may be measured starting from the time point at which the HW #1 and the HW #2 receive the respective audio samples of the uplink audio data M1(i) and M2(i). The ending time point of the first processing time period Δ1 should be earlier than the anchor Anchor1(i) of the earphone #1, and the ending time point of the second processing time period Δ2 should be earlier than the anchor Anchor2(i) of the earphone #2, where it is unnecessary that both of the respective ending time point of the first processing time period Δ1 and the second processing time period Δ2 are earlier than the anchor Anchor0(i) of the UE 100 such as the UE 300. For example, for the case of i=1 (e.g., the time point at which the HW #1 and the HW #2 receive the respective audio samples of the uplink audio data M1(1) and M2(1) can be the time point indicated by the first vertical dashed line as shown in the upper left of FIG. 7), the ending time point of the first processing time period Δ1 should be earlier than the anchor Anchor1 (1) of the earphone #1, and the ending time point of the second processing time period Δ2 should be earlier than the anchor Anchor2(1) of the earphone #2, where it is unnecessary that both of the respective ending time point of the first processing time period Δ1 and the second processing time period Δ2 are earlier than the anchor Anchor0(1) of the UE 100 such as the UE 300; for the case of i=2 (e.g., the time point at which the HW #1 and the HW #2 receive the respective audio samples of the uplink audio data M1(2) and M2(2) is typically later than the time point at which the HW #1 and the HW #2 receive the respective audio samples of the uplink audio data M1(1) and M2(1)), the ending time point of the first processing time period Δ1 should be earlier than the anchor Anchor1(2) of the earphone #1, and the ending time point of the second processing time period Δ2 should be earlier than the anchor Anchor2(2) of the earphone #2, where it is unnecessary that both of the respective ending time point of the first processing time period Δ1 and the second processing time period Δ2 are earlier than the anchor Anchor0(2) of the UE 100 such as the UE 300; and the rest can be deduced by analogy. For brevity, similar descriptions for this embodiment are not repeated in detail here.

According to some embodiments, the UE 100 such as the UE 300 can determine the time point of the anchor Anchor1 (i) of the earphone #1 and the time point of the anchor Anchor2(i) of the earphone #2 according to the scheduling at the master side (e.g., the UE schedule) for the earphones #1 and #2, respectively, to be the deadlines for the preparation of the uplink audio data M1(i) and M2(i) at the slave side, respectively, to allow the earphones #1 and #2 to perform their own timing control with aid of the UE 100 such as the UE 300, respectively, for example, complete the preparation of the uplink audio data M1(i) and M2(i) at the slave side before the time point of the anchor Anchor1(i) and the time point of the anchor Anchor2(i) that are determined at the master side, respectively, but the present invention is not limited thereto. In addition, the time point of the anchor Anchor1(i) can be equal to or earlier than the beginning time point of the first secondary time slot (e.g., the secondary time slot for performing a first set of TX and RX operations, such as the TX operation of S1(i) and the RX operation of M1(i) for the case of i=1 as shown in the lower half of FIG. 7) within the $i^{th}$ time slot starting from the anchor Anchor0(i) at the master side, and the time point of the anchor Anchor2 (i) can be equal to or earlier than the beginning time point of the second secondary time slot (e.g., the secondary time slot for performing a second set of TX and RX operations, such as the TX operation of S2(i) and the RX operation of M2(i) for the case of i=1 as shown in the lower half of FIG. 7) within the $i^{th}$ time slot.

The first set of TX and RX operations such as the TX operation of S1(i) and the RX operation of M1(i) at the master side can be regarded as a first CIS event within the $i^{th}$ time slot, and the second set of TX and RX operations such as the TX operation of S2(i) and the RX operation of M2(i) at the master side can be regarded as a second CIS event within the $i^{th}$ time slot, where a CIG event within the $i^{th}$ time slot may comprise the first CIS event and the second CIS event. As RX and TX operations at the slave side correspond to TX and RX operations at the master side, respectively, a set of RX and TX operations such as the RX operation of S1(i) and the TX operation of M1(i) at the slave side can be regarded as a CIS event for the stream #1 of the earphone #1, and a set of RX and TX operations such as the RX operation of S2(i) and the TX operation of M2(i) at the slave side can be regarded as a CIS event for the stream #2 of the earphone #2. For brevity, similar descriptions for these embodiments are not repeated in detail here.

Figure 8:
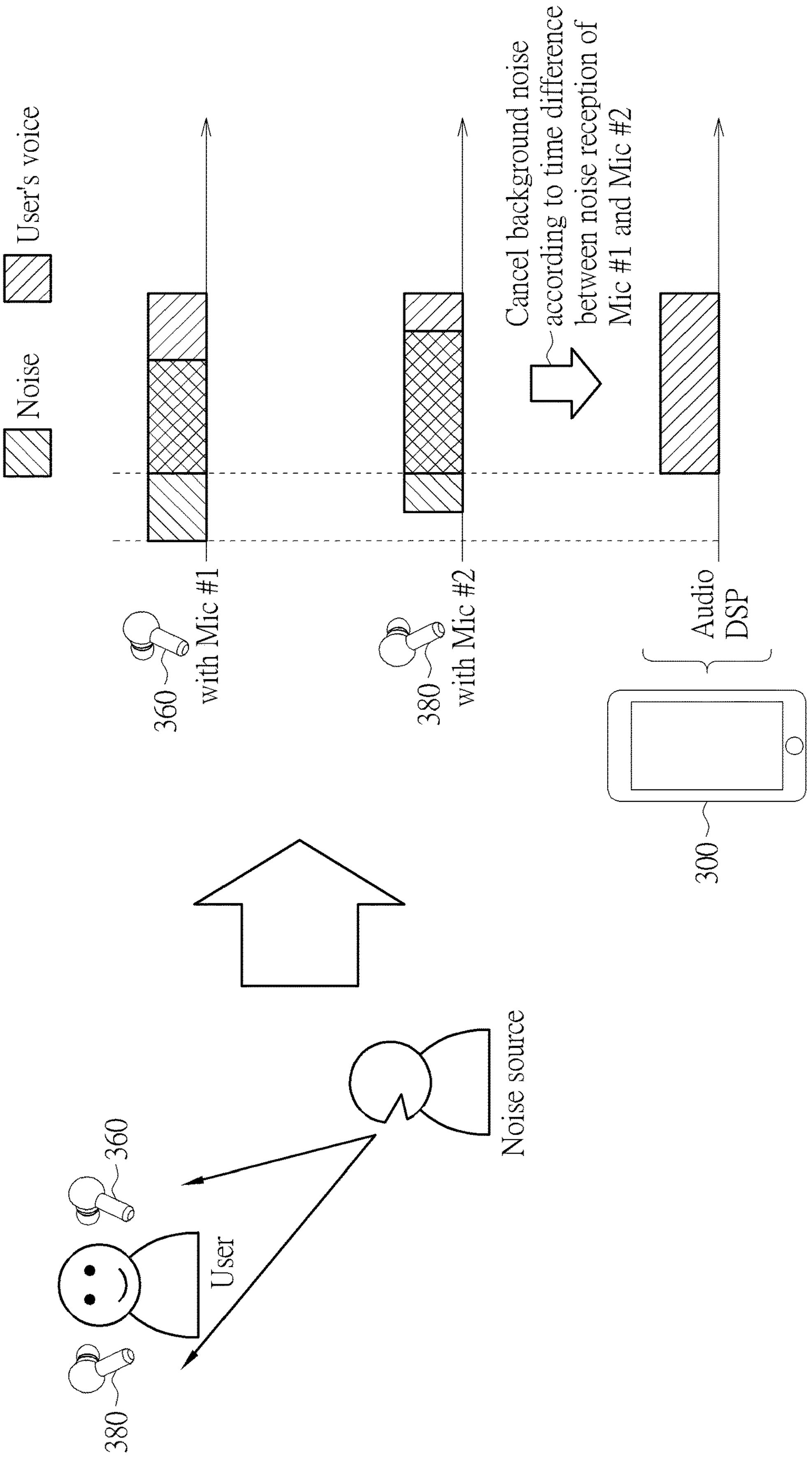
FIG. 8 illustrates a noise cancellation control scheme of the method for performing audio enhancement with aid of timing control according to an embodiment of the present invention.

FIG. 8 illustrates a noise cancellation control scheme of the method for performing audio enhancement with aid of timing control according to an embodiment of the present invention. As shown in the left half of FIG. 8, when the user is holding the conversation with the far-end user in the hand-free manner with aid of the earphones #1 and #2, a noise source such as somebody that is talking loudly and standing or walking nearby may produce much noise. As shown in the right half of FIG. 8, the UE 100 such as the UE 300 can perform acoustic beam forming, and more particularly, cancel background noise such as the nose of the noise source according to a time difference between the respective noise reception of the Mic #1 and the Mic #2. For example, the noise received by the Mic #1 may overlap the user's voice along the horizontal axis (e.g., the time axis) in a first manner, and the noise received by the Mic #2 may overlap the user's voice along the horizontal axis (e.g., the time axis) in a second manner, where the time difference may represent a difference between a first time range of the noise received by the Mic #1 and a second time range of the noise received by the Mic #2, such as a timing shift between the noise waveforms of the noise received by the Mic #1 and the noise waveforms of the noise received by the Mic #2. The DSP circuit #0 (e.g., the part-two processing circuit therein) can perform the part-two processing such as the NR processing on the uplink audio data M1(i) and M2(i), and more particularly, recognize the noise in each of the uplink audio data M1(i) and M2(i) at least according to this time difference and remove the noise from each of the uplink audio data M1(i) and M2(i).

As the uplink audio data M1(i) and M2(i) can be transmitted from the slave side (e.g., the earphones #1 and #2) to the master side (e.g., the UE 100 such as the UE 300) in time, and as none of the frame-based error and the sample-based error may occur in the electronic system, the present invention method and associated apparatus can guarantee that the part-two processing (e.g., the NR processing) is performed successfully without being hindered by any error (e.g., any frame-based error or any sample-based error). For brevity, similar descriptions for this embodiment are not repeated in detail here.

As shown in the left half of FIG. 8, the earphones #1 and #2 (e.g., the earphones 160 and 180 such as the earphones

360 and 380) may represent the earphones at the left-hand side and the right-hand side of the user, respectively, such as the earphones worn inside the left ear and the right ear of the user, respectively, but the present invention is not limited thereto. According to some embodiments, the earphones #2 and #1 may represent the earphones at the left-hand side and the right-hand side of the user, respectively, such as the earphones worn inside the left ear and the right ear of the user, respectively.

Figure 9:
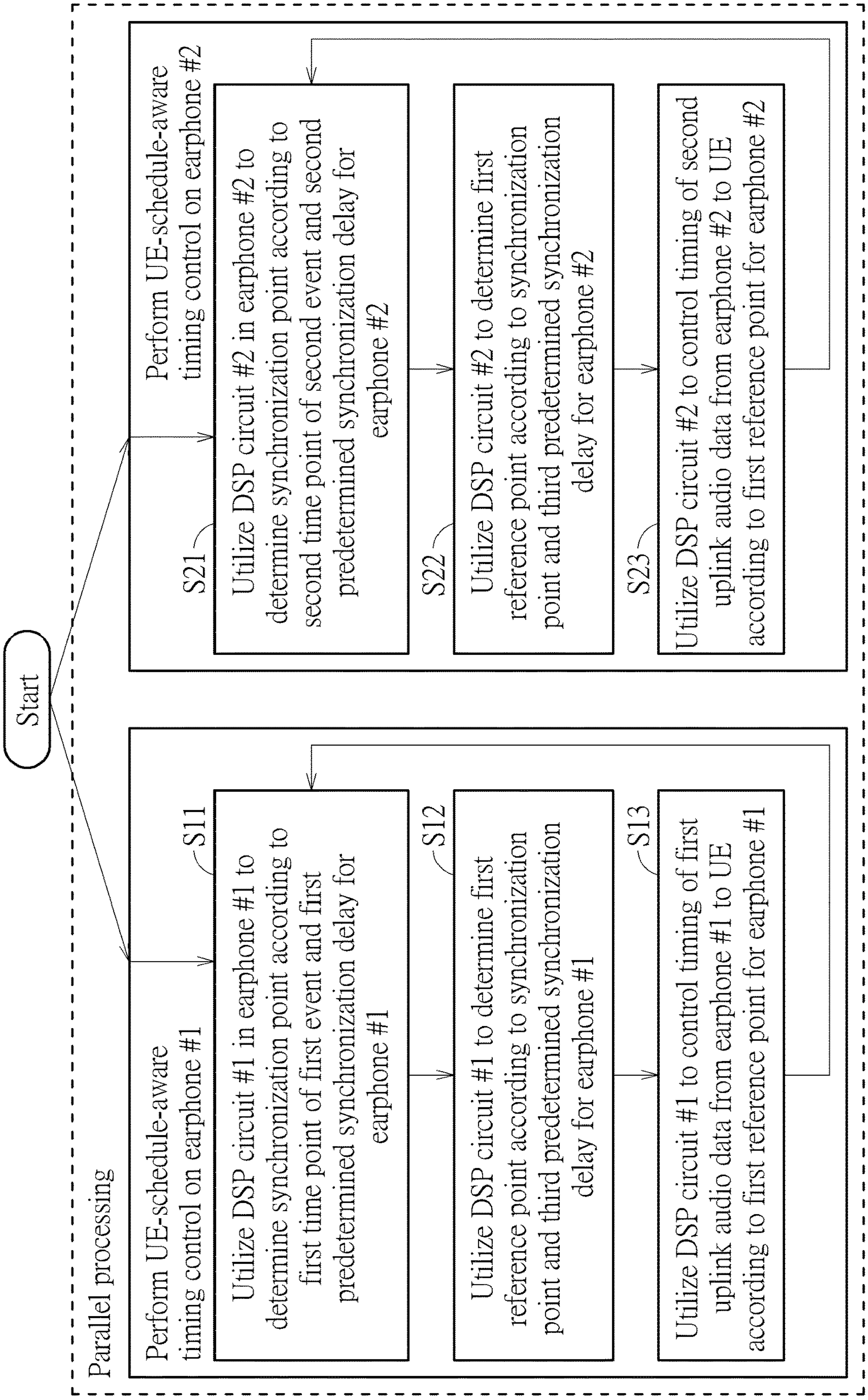
FIG. 9 illustrates a working flow of the method for performing audio enhancement with aid of timing control according to an embodiment of the present invention.

FIG. 9 illustrates a working flow of the method for performing audio enhancement with aid of timing control according to an embodiment of the present invention.

In Step S11, the electronic system can utilize the DSP circuit #1 in the earphone #1 to determine the synchronization point (e.g., the CIG synchronization point of the CIG event) according to the first time point of the first event (e.g., the CIS event for the earliest CIS) and the first predetermined synchronization delay (e.g., the synchronization delay CIS_Sync_Delay(1) corresponding to the earliest CIS) for the earphone #1, where the first predetermined synchronization delay is determined by the UE 100 such as the UE 300.

In Step S12, the electronic system can utilize the DSP circuit #1 to determine the first reference point (e.g., the CIG reference point) according to the synchronization point (e.g., the CIG synchronization point of the CIG event) and the third predetermined synchronization delay (e.g., the CIG synchronization delay CIG_Sync_Delay of the CIG event) for the earphone #1, where the third predetermined synchronization delay is determined by the UE 100 such as the UE 300.

In Step S13, the electronic system can utilize the DSP circuit #1 to control the timing of the uplink audio data M1(i) (e.g., the uplink audio data M1(1)) from the earphone #1 to the UE 100 such as the UE 300 according to the first reference point (e.g., the CIG reference point) for the earphone #1.

In Step S21, the electronic system can utilize the DSP circuit #2 in the earphone #2 to determine the synchronization point (e.g., the CIG synchronization point of the CIG event) according to the second time point of the second event (e.g., the CIS event for the middle CIS) and the second predetermined synchronization delay (e.g., the synchronization delay CIS_Sync_Delay(2) corresponding to the middle CIS) for the earphone #2, where the second predetermined synchronization delay is determined by the UE 100 such as the UE 300.

In Step S22, the electronic system can utilize the DSP circuit #2 to determine the first reference point (e.g., the CIG reference point) according to the synchronization point (e.g., the CIG synchronization point of the CIG event) and the third predetermined synchronization delay (e.g., the CIG synchronization delay CIG_Sync_Delay of the CIG event) for the earphone #2.

In Step S23, the electronic system can utilize the DSP circuits #2 to control the timing of the uplink audio data M2(i) (e.g., the uplink audio data M2(1)) from the earphone #2 to the UE 100 such as the UE 300 according to the first reference point (e.g., the CIG reference point) for the earphone #2.

As shown in FIG. 9, the electronic system can perform parallel processing, and more particularly, perform the UE-schedule-aware timing control on earphone #1 (e.g., the operations of Steps S11-S13) and the UE-schedule-aware timing control on earphone #2 (e.g., the operations of Steps S21-S23) in a parallel manner. For brevity, similar descriptions for this embodiment are not repeated in detail here.

For better comprehension, the method may be illustrated with the working flow shown in FIG. 9, but the present invention is not limited thereto. According to some embodiments, one or more steps may be added, deleted, or changed in the working flow shown in FIG. 9.

Figure 10:
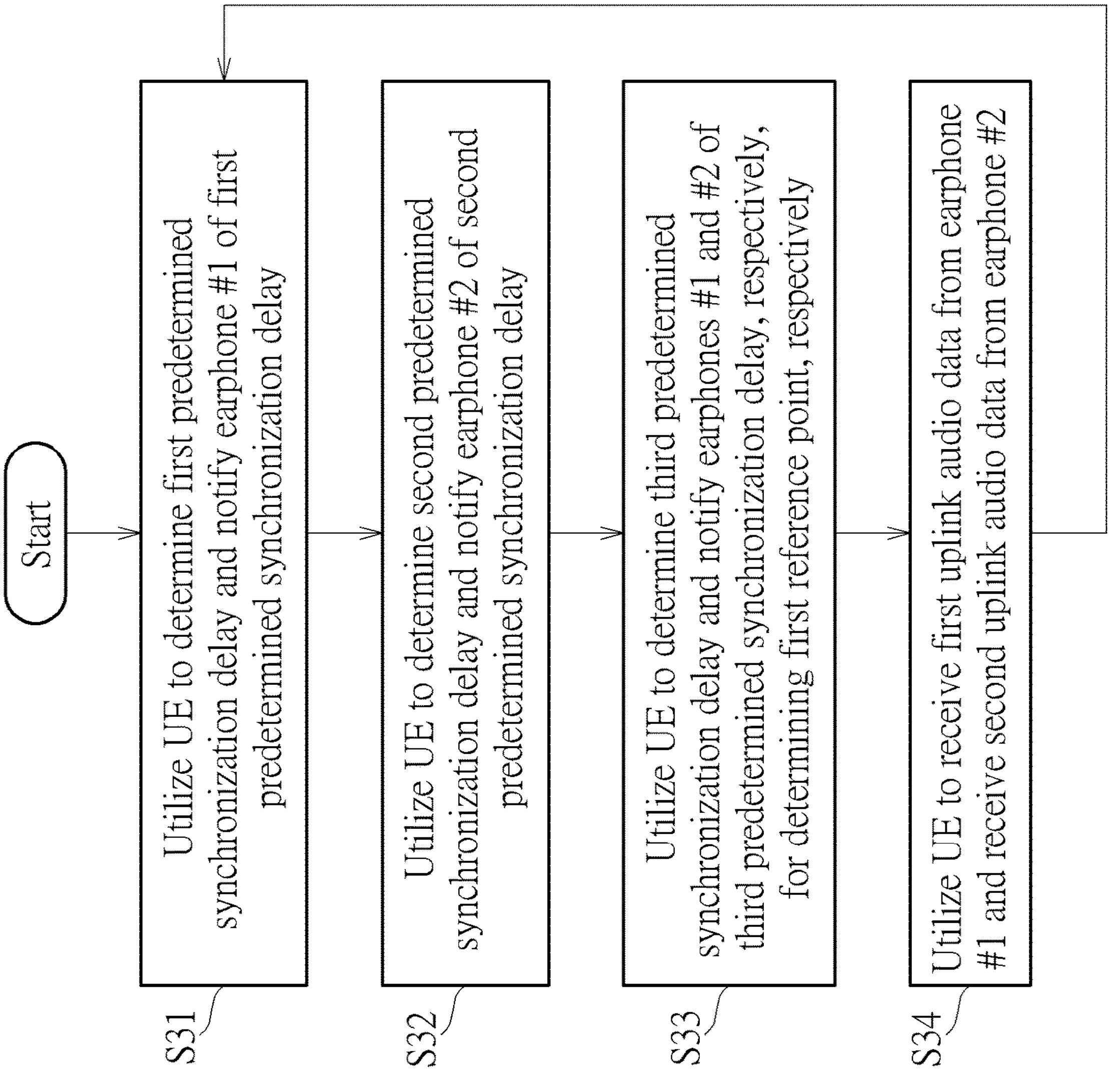
FIG. 10 illustrates a working flow of the method for performing audio enhancement with aid of timing control according to another embodiment of the present invention.

FIG. 10 illustrates a working flow of the method for performing audio enhancement with aid of timing control according to another embodiment of the present invention.

In Step S31, the electronic system can utilize the UE 100 such as the UE 300 to determine the first predetermined synchronization delay (e.g., the synchronization delay CIS_Sync_Delay(1) corresponding to the earliest CIS) and notify the earphone #1 of the first predetermined synchronization delay, where the DSP circuit #1 in the earphone #1 can determine the synchronization point (e.g., the CIG synchronization point of the CIG event) according to the first time point of the first event (e.g., the CIS event for the earliest CIS) and the first predetermined synchronization delay (e.g., the synchronization delay CIS_Sync_Delay(1) corresponding to the earliest CIS) for the earphone #1.

In Step S32, the electronic system can utilize the UE 100 such as the UE 300 to determine the second predetermined synchronization delay (e.g., the synchronization delay CIS_Sync_Delay(2) corresponding to the middle CIS) and notify the earphone #2 of the second predetermined synchronization delay, where the DSP circuit #2 in the earphone #2 can determine the synchronization point (e.g., the CIG synchronization point of the CIG event) according to the second time point of the second event (e.g., the CIS event for the middle CIS) and the second predetermined synchronization delay (e.g., the synchronization delay CIS_Sync_Delay(2) corresponding to the middle CIS) for the earphone #2.

In Step S33, the electronic system can utilize the UE 100 such as the UE 300 to determine the third predetermined synchronization delay (e.g., the CIG synchronization delay CIG_Sync_Delay of the CIG event) and notify the first earphone and the second earphone of the third predetermined synchronization delay, respectively, for determining the first reference point, respectively, where the DSP circuit #1 can determine the first reference point (e.g., the CIG reference point) according to the synchronization point (e.g., the CIG synchronization point of the CIG event) and the third predetermined synchronization delay (e.g., the CIG synchronization delay CIG_Sync_Delay of the CIG event) for the earphone #1, and the DSP circuit #2 can determine the first reference point (e.g., the CIG reference point) according to the synchronization point (e.g., the CIG synchronization point of the CIG event) and the third predetermined synchronization delay (e.g., the CIG synchronization delay CIG_Sync_Delay of the CIG event) for the earphone #2.

In Step S34, the electronic system can utilize the UE 100 such as the UE 300 to receive the uplink audio data M1(i) (e.g., the uplink audio data M1(1)) from the earphone #1 and receive the uplink audio data M2(i) (e.g., the uplink audio data M2(1)) from the earphone #2, where the DSP circuit #1 can control the timing of the uplink audio data M1(i) (e.g., the uplink audio data M1(1)) from the earphone #1 to the UE 100 such as the UE 300 according to the first reference point (e.g., the CIG reference point) for the earphone #1, and the DSP circuits #2 can control the timing of the uplink audio data M2(i) (e.g., the uplink audio data M2(1)) from the earphone #2 to the UE 100 such as the UE 300 according to the first reference point (e.g., the CIG reference point) for the earphone #2.

For better comprehension, the method may be illustrated with the working flow shown in FIG. 10, but the present invention is not limited thereto. According to some embodiments, one or more steps may be added, deleted, or changed in the working flow shown in FIG. 10.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing audio enhancement with aid of timing control, the method being applied to a user equipment (UE) wirelessly connected to a first earphone and a second earphone, the method comprising:

utilizing the UE to determine a first predetermined synchronization delay and notify the first earphone of the first predetermined synchronization delay, wherein a first digital signal processing (DSP) circuit in the first earphone is arranged to determine a synchronization point according to a first time point of a first event and the first predetermined synchronization delay for the first earphone;

utilizing the UE to determine a second predetermined synchronization delay and notify the second earphone of the second predetermined synchronization delay, wherein a second DSP circuit in the second earphone is arranged to determine the synchronization point according to a second time point of a second event and the second predetermined synchronization delay for the second earphone; and utilizing the UE to receive first uplink audio data from the first earphone and receive second uplink audio data from the second earphone, wherein the first DSP circuit and the second DSP circuit are arranged to control timing of the first uplink audio data from the first earphone to the UE and timing of the second uplink audio data from the second earphone to the UE according to a first reference point for the first earphone and the second earphone, respectively, wherein the first reference point is determined at least according to the synchronization point.

2. The method of claim 1, wherein the synchronization point is used as a downlink playback reference time point.

3. The method of claim 2, wherein the downlink playback reference point represents a Bluetooth Low Energy (BLE) True Wireless Stereo (TWS) downlink playback reference time point.

4. The method of claim 1, wherein the synchronization point is later than each of the first time point and the second time point; and a time difference between the synchronization point and the first time point is equal to the first predetermined synchronization delay, and a time difference between the synchronization point and the second time point is equal to the second predetermined synchronization delay.

5. The method of claim 1, wherein the first reference point is used as an uplink audio data reference time point.

6. The method of claim 1, further comprising:

utilizing the UE to determine a third predetermined synchronization delay and notify the first earphone and the second earphone of the third predetermined synchronization delay, respectively, for determining the first reference point, respectively.

7. The method of claim 6, wherein:

the first DSP circuit is arranged to determine the first reference point according to the synchronization point and the third predetermined synchronization delay for the first earphone, wherein the third predetermined synchronization delay is greater than any of the first predetermined synchronization delay and the second predetermined synchronization delay; and the second DSP circuit is arranged to determine the first reference point according to the synchronization point and the third predetermined synchronization delay for the second earphone.

8. The method of claim 6, wherein the first reference point is earlier than the synchronization point; and a time difference between the synchronization point and the first reference point is equal to the third predetermined synchronization delay.

9. The method of claim 1, wherein the first time point and the second time point represent beginning time points of a first secondary time slot and a second secondary time slot within a time slot corresponding to a same audio data frame, respectively.

10. The method of claim 1, wherein the first uplink audio data and the second uplink audio data are transmitted to the UE within a time slot among multiple time slots.

11. The method of claim 10, wherein:

the first DSP circuit is arranged to complete processing of the first uplink audio data before the first time point, for transmitting the first uplink audio data to the UE in a first secondary time slot within the time slot; and the second DSP circuit is arranged to complete processing of the second uplink audio data before the second time point, for transmitting the second uplink audio data to the UE in a second secondary time slot within the time slot.

12. The method of claim 1, wherein the first uplink audio data and the second uplink audio data represent a set of stereo audio data corresponding to a same sampling time period.

13. The method of claim 1, wherein:

the first DSP circuit is arranged to complete processing of the first uplink audio data before the first time point, and to transmit the first uplink audio data, as well as a first sampling time offset of the first uplink audio data, to the UE in a first secondary time slot within a time slot; and the second DSP circuit is arranged to complete processing of the second uplink audio data before the second time point, and to transmit the second uplink audio data, as well as a second sampling time offset of the second uplink audio data, to the UE in a second secondary time slot within the time slot.

14. The method of claim 13, wherein the first sampling time offset represents a time difference between the first reference point and a start sampling time of multiple audio samples within the first uplink audio data, and the second sampling time offset represents a time difference between the first reference point and a start sampling time of multiple audio samples within the second uplink audio data.

15. The method of claim 13, further comprising:

utilizing an audio DSP circuit in the UE to perform sampling time calibration on any of the first uplink audio data and the second uplink audio data according to the first sampling time offset and the second sampling time offset.

16. The method of claim 13, further comprising:

in response to receiving any uplink audio data among the first uplink audio data and the second uplink audio data being unsuccessful, utilizing an audio DSP circuit in the UE to convert received uplink audio data among the first uplink audio data and the second uplink audio data into an emulated uplink audio data according to the first sampling time offset and the second sampling time offset, to be a replacement of the any uplink audio data.

17. A first earphone, the first earphone and a second earphone being wirelessly connected to a user equipment (UE), the first earphone comprising:

a wireless communications interface circuit, arranged to perform wireless communications with the UE for the first earphone;

an audio input device, arranged to input audio waves to generate input audio data;

an audio output device, arranged to output audio waves according to output audio data; and a first digital signal processing (DSP) circuit, coupled to the wireless communications interface circuit, the audio input device and the audio output device, arranged to perform signal processing on any of the input audio data and the output audio data for the first earphone;

wherein:

the first DSP circuit determines a synchronization point according to a first time point of a first event and a first predetermined synchronization delay for the first earphone, wherein the first predetermined synchronization delay is determined by the UE;

a second DSP circuit in the second earphone determines the synchronization point according to a second time point of a second event and a second predetermined synchronization delay for the second earphone, wherein the second predetermined synchronization delay is determined by the UE;

the first DSP circuit determines a first reference point according to the synchronization point and a third predetermined synchronization delay for the first earphone, wherein the third predetermined synchronization delay is greater than any of the first predetermined synchronization delay and the second predetermined synchronization delay;

the second DSP circuit determines the first reference point according to the synchronization point and the third predetermined synchronization delay for the second earphone; and the first DSP circuit and the second DSP circuit controls timing of first uplink audio data from the first earphone to the UE and timing of second uplink audio data from the second earphone to the UE according to the first reference point for the first earphone and the second earphone, respectively.

18. A user equipment (UE), a first earphone and a second earphone being wirelessly connected to the UE, the UE comprising:

a wireless communications interface circuit, arranged to perform wireless communications with the first earphone and the second earphone for the UE; and an audio digital signal processing (DSP) circuit, coupled to the wireless communications interface circuit, arranged to perform signal processing for the UE;

wherein:

the UE is arranged to determine a first predetermined synchronization delay and notify the first earphone of the first predetermined synchronization delay, wherein a first DSP circuit in the first earphone is arranged to determine a synchronization point according to a first time point of a first event and the first predetermined synchronization delay for the first earphone;

the UE is arranged to determine a second predetermined synchronization delay and notify the second earphone of the second predetermined synchronization delay, wherein a second DSP circuit in the second earphone is arranged to determine the synchronization point according to a second time point of a second event and the second predetermined synchronization delay for the second earphone; and the UE is arranged to receive first uplink audio data from the first earphone and receive second uplink audio data from the second earphone, wherein the first DSP circuit and the second DSP circuit are arranged to control timing of the first uplink audio data from the first earphone to the UE and timing of the second uplink audio data from the second earphone to the UE according to a first reference point for the first earphone and the second earphone, respectively, wherein the first reference point is determined at least according to the synchronization point.

19. The UE of claim 18, wherein the first DSP circuit is arranged to complete processing of the first uplink audio data before the first time point, and to transmit the first uplink audio data, as well as a first sampling time offset of the first uplink audio data, to the UE in a first secondary time slot within a time slot; and the second DSP circuit is arranged to complete processing of the second uplink audio data before the second time point, and to transmit the second uplink audio data, as well as a second sampling time offset of the second uplink audio data, to the UE in a second secondary time slot within the time slot.

20. The UE of claim 19, wherein the audio DSP circuit is arranged to perform sampling time calibration on any of the first uplink audio data and the second uplink audio data according to the first sampling time offset and the second sampling time offset.

* * * * *